US008462265B2

(12) United States Patent
Lu

(10) Patent No.: US 8,462,265 B2
(45) Date of Patent: Jun. 11, 2013

(54) GRADIENT ADAPTIVE VIDEO DE-INTERLACING

(75) Inventor: Tiehan Lu, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 13/198,093

(22) Filed: Aug. 4, 2011

(65) Prior Publication Data
US 2012/0092553 A1 Apr. 19, 2012

Related U.S. Application Data

(63) Continuation of application No. 11/648,259, filed on Dec. 29, 2006, now Pat. No. 8,018,530.

(51) Int. Cl.
H04N 7/01 (2006.01)
(52) U.S. Cl.
USPC .......................................... 348/448; 348/452
(58) Field of Classification Search
USPC .................. 348/448, 451, 452, 441, 458, 459
IPC ............................................... H04N 7/01,11/20
See application file for complete search history.

(56) References Cited

U.S. PATENT DOCUMENTS

| 6,577,345 B1 | 6/2003 | Lim et al. |
| 2004/0070686 A1 | 4/2004 | Jung et al. |
| 2004/0207753 A1 | 10/2004 | Jung |
| 2005/0036063 A1 | 2/2005 | Chen et al. |
| 2006/0120452 A1 | 6/2006 | Li |
| 2006/0139486 A1 | 6/2006 | Caviedes |
| 2006/0215085 A1 | 9/2006 | Lu et al. |
| 2008/0158416 A1 | 7/2008 | Lu |

FOREIGN PATENT DOCUMENTS

| EP | 1 515 543 A2 | 3/2005 |
| WO | 2005/076612 A1 | 8/2005 |
| WO | 2005/112447 A1 | 11/2005 |
| WO | 2006/126169 A2 | 11/2006 |

OTHER PUBLICATIONS

Faroudja, "FLI2200 Digital Component Video Deinterlacer/Line Doubler", Rev. 1.04, Jan. 19, 2001, Foroudja Laboratories a Division of Sage, Inc. 52 pages. Download from: www.datasheetarchive.com.
"FLI2310 Digital Video Format Converter Product Brief", Mar. 2003, Genesis Microchip Inc., document C0702-PBR-01B. 2pgs. Download from: www.datasheetarchive.com.
"Product Brief FLI2200", Faroudja a Division of Sage Inc., 2pgs. Download from: www.datasheetarchive.com.

(Continued)

Primary Examiner — Sherrie Hsia
(74) Attorney, Agent, or Firm — Buckley, Maschoff & Talwalkar LLC

(57) ABSTRACT

In some embodiments, a method includes receiving a plurality of video signal fields, characterizing at least one portion of at least one of the plurality of video signal fields, determining a value for a pixel using inter-field de-interlacing if the characterization satisfies a first criteria, determining a value for a pixel using motion compensated de-interlacing if the characterization satisfies a second criteria, and determining a value for a pixel using intra-field de-interlacing if the characterization satisfies a third criteria. In some embodiments, an apparatus includes a storage medium having stored instructions that when executed by a machine result in the method.

10 Claims, 24 Drawing Sheets

OTHER PUBLICATIONS

Yu-Lin Chang et al., Video De-Interlacing by Adaptive 4-Field Global/Local Motion Compensated Approach, IEEE Transactions on Circuits and Systems for Video Technology, vol. 15, No. 12, Dec. 2005, (pp. 1569-1582, 14 pages total).

"Chinese Office Action", dated Aug. 24, 2010, along with English translation of the Chinese Office Action, for Chinese Patent Application No. 200780048591.8, 22pgs.

GRADIENT ADAPTIVE VIDEO DE-INTERLACING

CROSS-REFERENCE TO RELATED APPLICATIONS

The present application is a continuation of U.S. patent application Ser. No. 11/648,259, filed Dec. 29, 2006 now U.S. Pat. No. 8,018,530 and entitled "GRADIENT ADAPTIVE VIDEO DE-INTERLACING." The entire content of that application is incorporated herein by reference.

BACKGROUND

For a variety of applications, it is necessary to convert conventional interlaced video signal frames into a progressive scan format. For example, it may be necessary to convert an interlaced signal received over the air into a progressive scan format for display on a digital video monitor.

A number of de-interlacing techniques have been proposed. According to an inter-field technique known as "weave", the pixel to be generated is taken from the corresponding pixel in the previous field. This technique may result in artifacts when there is motion in the video signal at the point of interpolation.

According to an intra-field technique know as "bob", the pixel value to be generated is interpolated from the two pixels in the same field which are respectively directly above and directly below the pixel to be generated. This technique may result in loss of resolution and creation of certain artifacts.

In another technique, sometimes referred to as "motion adaptive" de-interlacing, motion detection is applied at the point where interpolation is occurring. If there is no motion, a "weave" approach is applied. If there is motion at the current point, a "bob" approach is applied. In another proposed motion adaptive de-interlacing technique, the pixel value to be generated is obtained as a weighted average of the pixel values that would be obtained by the "bob" and "weave" approaches, and the weights applied to the bob and weave pixel values vary depending on the degree of motion. Even with these approaches, however, goals for image quality may not be met.

Another technique is known as "motion compensated" de-interlacing. In this approach, motion between the current field and the previous field is estimated to produce motion vectors at, for example, each pixel location. Then interpolation is performed using pixels from the previous frame that have been relocated in accordance with the motion vectors. Motion compensated de-interlacing generally produces superior results in terms of image quality, but requires a high degree of processing complexity, and may still fall short of the desired level of image quality.

DETAILED DESCRIPTION

Figure 1:
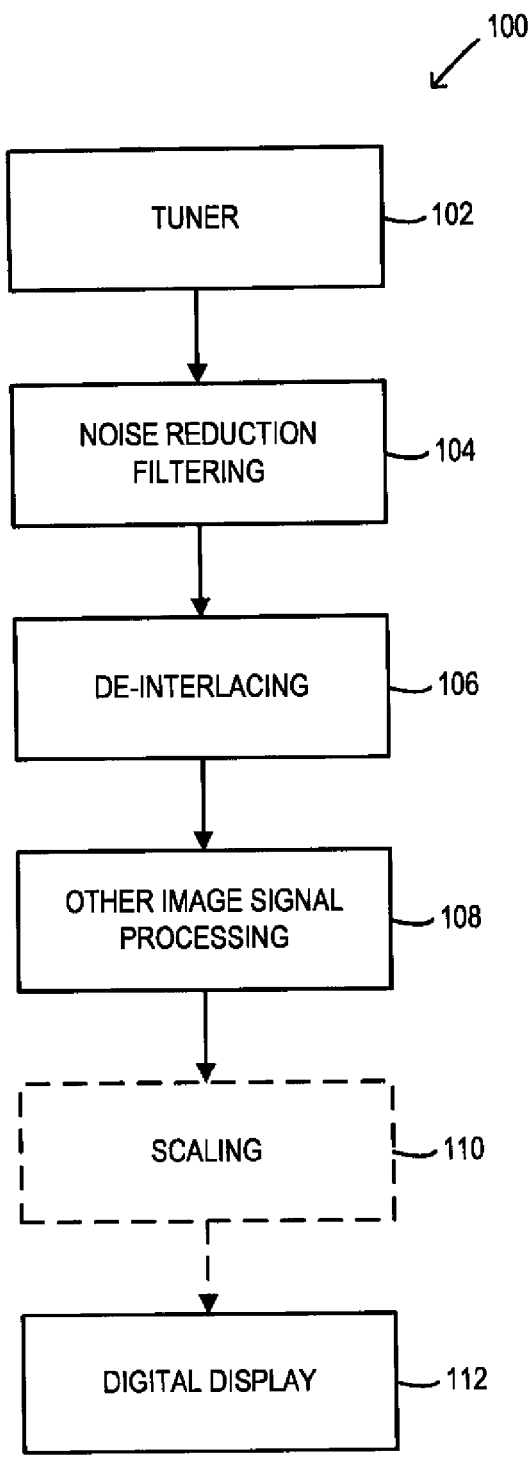
FIG. 1 is a block diagram of an apparatus in accordance with some embodiments.

FIG. 1 is a block diagram of an apparatus 100 which performs a de-interlacing process in accordance with some embodiments.

The apparatus 100 may include a tuner 102 or other source of interlaced video signal. Though not separately shown, the tuner 102 may include, if necessary, suitable circuitry for converting the interlaced video signal into a digital interlaced video signal.

The apparatus 100 may also include a noise reduction filtering block 104 which is coupled to the tuner 102 and which performs noise reduction filtering on the digital signal provided by the tuner 102.

In addition, the apparatus 100 includes a de-interlacing process block 106 which is coupled to the noise reduction filtering block 104 and which performs de-interlacing of the digital video signal in accordance with some embodiments. (It will be appreciated that the de-interlacing process block 106 may be considered to be coupled to the tuner 102 via the noise reduction filter block 104.)

Further, the apparatus 100 may include one or more other image signal processing blocks (indicated at 108) to perform one or more other processes on the de-interlaced video signal, such as sharpness enhancement, color correction, gamma correction, etc.

The apparatus 100 may also include a scaling block 110 (shown in phantom) to perform resizing of the image for display on a digital display component 112, which may also be included in the apparatus 100.

Except for the de-interlacing process block 106, the components of the apparatus 100 may be configured and may operate in accordance with conventional practices.

Figure 2:
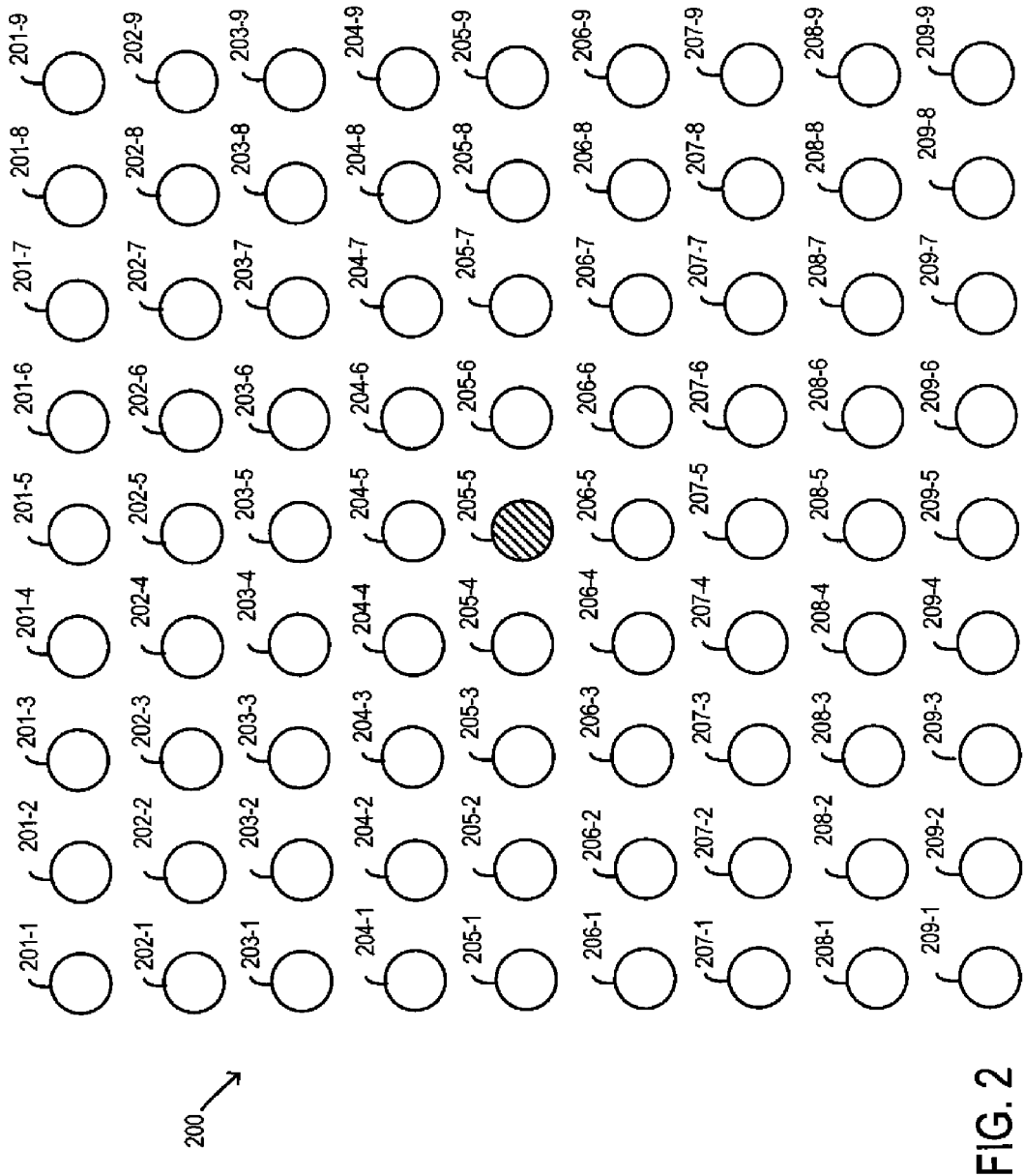
FIG. 2 schematically illustrates a group of pixels in accordance with some embodiments.

FIG. 2 schematically illustrates an example of a group of pixels 200 in a current field (sometimes referred to as an Nth field). In FIG. 2, the group of pixels 200 includes a first line of pixels 201-1 to 201-9, a second line of pixels 202-1 to 202-9, a third line of pixels 203-1 to 203-9, a fourth line of pixels 204-1 to 204-9, a fifth line of pixels 205-1 to 205-9, a sixth line of pixels 206-1 to 206-9, a seventh line of pixels 207-1 to 207-9, an eighth line of pixels 208-1 to 208-9 and a ninth line of pixels 209-1 to 209-1.

In this group of pixels 200, the second line of pixels 202-1 to 202-9, the fourth line of pixels 204-1 to 204-9, the sixth line of pixels 206-1 to 206-9 and the eighth line of pixels 208-1 to 208-9 are included in the current field and are thus non interpolated pixels. The first line of pixels 201-1 to 201-9, the third line of pixels 203-1 to 203-9, the fifth line of pixels 205-1 to 205-9, the seventh line of pixels 207-1 to 207-9 and the ninth line of pixels 209-1 to 209-9 are not in the current field and are thus interpolated pixels, i.e., supplied by interpolation, in order to de-interlace the current field.

A hatched circle 205-5 indicates a location of a pixel for which a pixel value is to be interpolated. Pixel 205-4 is the pixel that is immediately to the left of pixel 205-5. Pixel 205-3 is the pixel that is immediately to the left of pixel 205-4. Pixel 205-2 is the pixel that is immediately to the left of pixel 205-3. Pixel 205-1 is the pixel that is immediately to the left of pixel 205-2. Pixel 205-6 is the pixel that is immediately to the right of pixel 205-5. Pixel 205-7 is the pixel that is immediately to the right of pixel 205-6. Pixel 205-8 is the pixel that is immediately to the right of pixel 205-7. Pixel 205-9 is the pixel that is immediately to the right of pixel 205-8.

Pixels 204-1 to 204-9 are pixels that make up part of a video signal line that is immediately above current pixel location 205-5. As stated above, the pixel values for pixels 204-1 to 204-9 are available, since the line that includes those pixels is included in the current field. Pixel 204-5 is the pixel that is immediately above the current pixel location 205-5. Pixel 204-4 is the pixel that is immediately to the left of pixel 204-5. Pixel 204-3 is the pixel that is immediately to the left of pixel 204-4. Pixel 204-2 is the pixel that is immediately to the left of pixel 204-3. Pixel 204-1 is the pixel that is immediately to the left of pixel 204-2. Pixel 204-6 is the pixel that is immediately to the right of pixel 204-5. Pixel 204-7 is the pixel that is immediately to the right of pixel 204-6. Pixel 204-8 is the pixel that is immediately to the right of pixel 204-7. Pixel 204-9 is the pixel that is immediately to the right of pixel 204-8.

Pixels 203-1 to 203-9 are pixels that make up part of a video signal line that is immediately above pixel location 204-5. As stated above, the pixel values for pixels 203-1 to 203-9 are not included in the current field and are thus interpolated pixels, i.e., supplied by interpolation, in order to de-interlace the current field. Pixel 203-5 is the pixel that is immediately above pixel location 204-5. Pixel 203-4 is the pixel that is immediately to the left of pixel 203-5. Pixel 203-3 is the pixel that is immediately to the left of pixel 203-4. Pixel 203-2 is the pixel that is immediately to the left of pixel 203-3. Pixel 203-1 is the pixel that is immediately to the left of pixel 203-2. Pixel 203-6 is the pixel that is immediately to the right of pixel 203-5. Pixel 203-7 is the pixel that is immediately to the right of pixel 203-6. Pixel 203-8 is the pixel that is immediately to the right of pixel 203-7. Pixel 203-9 is the pixel that is immediately to the right of pixel 203-8.

Pixels 202-1 to 202-9 are pixels that make up part of a video signal line that is immediately above pixels 203-1 to 203-9. As stated above, the pixel values for pixels 202-1 to 202-9 are available, since the line that includes those pixels is included in the current field.

Pixels 201-1 to 201-9 are pixels that make up part of a video signal line that is immediately above pixels 202-1 to 202-9. As stated above, the pixel values for pixels 203-1 to 203-9 are not included in the current field and are thus interpolated pixels, i.e., supplied by interpolation, in order to de-interlace the current field.

Pixels 206-1 to 206-9 are pixels that make up part of a video signal line that is immediately below current pixel location 205-5. As stated above, the pixel values for pixels 206-1 to 206-9 are available, since the line that includes those pixels is included in the current field. Pixel 206-5 is the pixel that is immediately below the current pixel location 205-5. Pixel 206-4 is the pixel that is immediately to the left of pixel 206-5. Pixel 206-3 is the pixel that is immediately to the left of pixel 206-4. Pixel 206-2 is the pixel that is immediately to the left of pixel 206-3. Pixel 206-1 is the pixel that is immediately to the left of pixel 206-2. Pixel 206-6 is the pixel that is immediately to the right of pixel 206-5. Pixel 206-7 is the pixel that is immediately to the right of pixel 206-6. Pixel 206-8 is the pixel that is immediately to the right of pixel 206-7. Pixel 206-9 is the pixel that is immediately to the right of pixel 206-8.

Pixels 207-1 to 207-9 are pixels that make up part of a video signal line that is immediately below pixel location 206-5. As stated above, the pixel values for pixels 207-1 to 207-9 are not included in the current field and are thus interpolated pixels, i.e., supplied by interpolation, in order to de-interlace the current field. Pixel 207-5 is the pixel that is immediately below pixel location 206-5. Pixel 207-4 is the pixel that is immediately to the left of pixel 207-5. Pixel 207-3 is the pixel that is immediately to the left of pixel 207-4. Pixel 207-2 is the pixel that is immediately to the left of pixel 207-3. Pixel 207-1 is the pixel that is immediately to the left of pixel 207-2. Pixel 207-6 is the pixel that is immediately to the right of pixel 207-5. Pixel 207-7 is the pixel that is immediately to the right of pixel 207-6. Pixel 207-8 is the pixel that is immediately to the right of pixel 207-7. Pixel 207-9 is the pixel that is immediately to the right of pixel 207-8.

Pixels 208-1 to 208-9 are pixels that make up part of a video signal line that is immediately below pixels 207-1 to 207-9. As stated above, the pixel values for pixels 208-1 to 208-9 are available, since the line that includes those pixels is included in the current field.

Pixels 209-1 to 209-9 are pixels that make up part of a video signal line that is immediately below pixels 208-1 to 208-9. As stated above, the pixel values for pixels 209-1 to 209-9 are not included in the current field and are thus interpolated pixels, i.e., supplied by interpolation, in order to de-interlace the current field.

Figure 3:
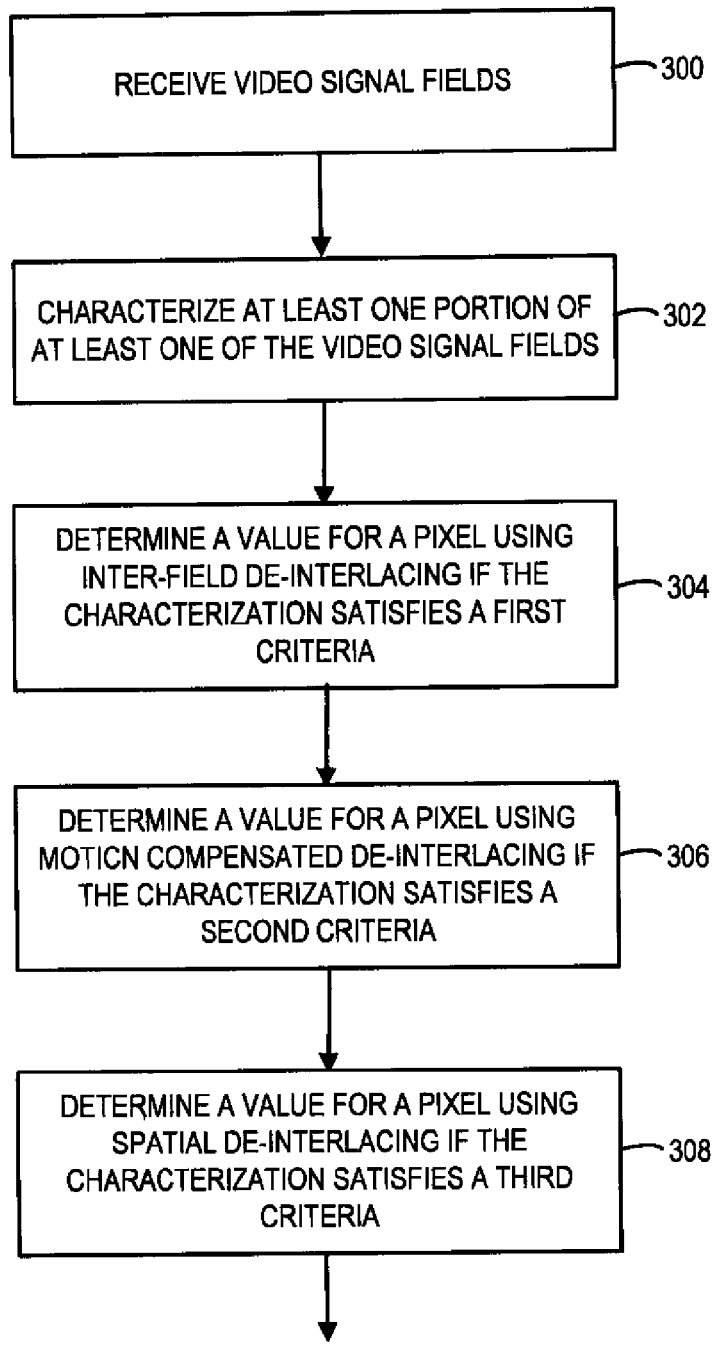
FIG. 3 is a flow chart that illustrates a process in accordance with some embodiments.

FIG. 3 is a flow chart that illustrates a de-interlacing process according to some embodiments. According to some embodiments, one or more portions of the process illustrated in FIG. 3 may be employed in the de-interlacing process block 106 illustrated in FIG. 1.

Referring now to FIG. 3, at 300, a plurality of video signal fields may be received. The video signal fields may be received from any source including, but not limited to, sources of interlaced video that are internal and/or external to the apparatus 100 (FIG. 1). The video signal fields may have any form. In some embodiments, the plurality of video signal fields define a sequence of video signal fields. In some embodiments, alternate fields may have an odd polarity. Other video signal fields may have an even polarity.

At 302, the de-interlacing process may include characterizing at least one portion of at least one of the video signal fields. In some embodiments, characterizing may include determining one or more characteristics of at least one portion of at least one of the video signal fields. In some embodiments, any method or methods may be used. In some embodiments, the process characterizes a portion of a video signal field. In some embodiments, the portion of the video signal comprises a location of a pixel to be interpolated. In some embodiments, the process may separately characterize the location of each pixel to be interpolated. In some embodiments, the process characterizes each location as having no motion, slow motion and/or fast moving.

At 304, the process may determine a value for a pixel using inter-field de-interlacing if the characterization satisfies a first criteria. Criteria may be any type or types of criteria. In some embodiments, the process uses inter-field de-interlacing if the location of the pixel to be added is characterized as having no motion.

At 306, the process may determine a value for a pixel using motion compensated de-interlacing if the characterization satisfies a second criteria. In some embodiments, the process uses motion compensated de-interlacing if the location of the pixel to be added is characterized as having slow motion.

At 308, the process may determine a value for a pixel using motion compensated de-interlacing if the characterization satisfies a third criteria. In some embodiments, the process uses intra-field de-interlacing if the location of the pixel to be added is characterized as having fast motion or fast moving.

In some embodiments, the process illustrated in FIG. 3 may be performed at some or all of the locations of pixels that are to be interpolated to supply missing lines of a video signal field and thus to de-interlace the video signal field. In that regard, in some embodiments, each stage of the process illustrated at FIG. 3 may be performed at a single pixel location for a pixel to be interpolated and/or may be repeated at a pixel location for each pixel to be interpolated. In some embodiments, such pixels may include each pixel to be interpolated at top, bottom and/or side edges. Alternatively, at top, bottom and/or side edges, one or more pixel values may be generated by one or more other processes such as filling with black pixels, filling with duplicates of edge pixel values, mirroring pixel values from the edge. In another alternative, at one or more edges, only intra-field de-interlacing or inter-field de-interlacing are used.

Figure 4:
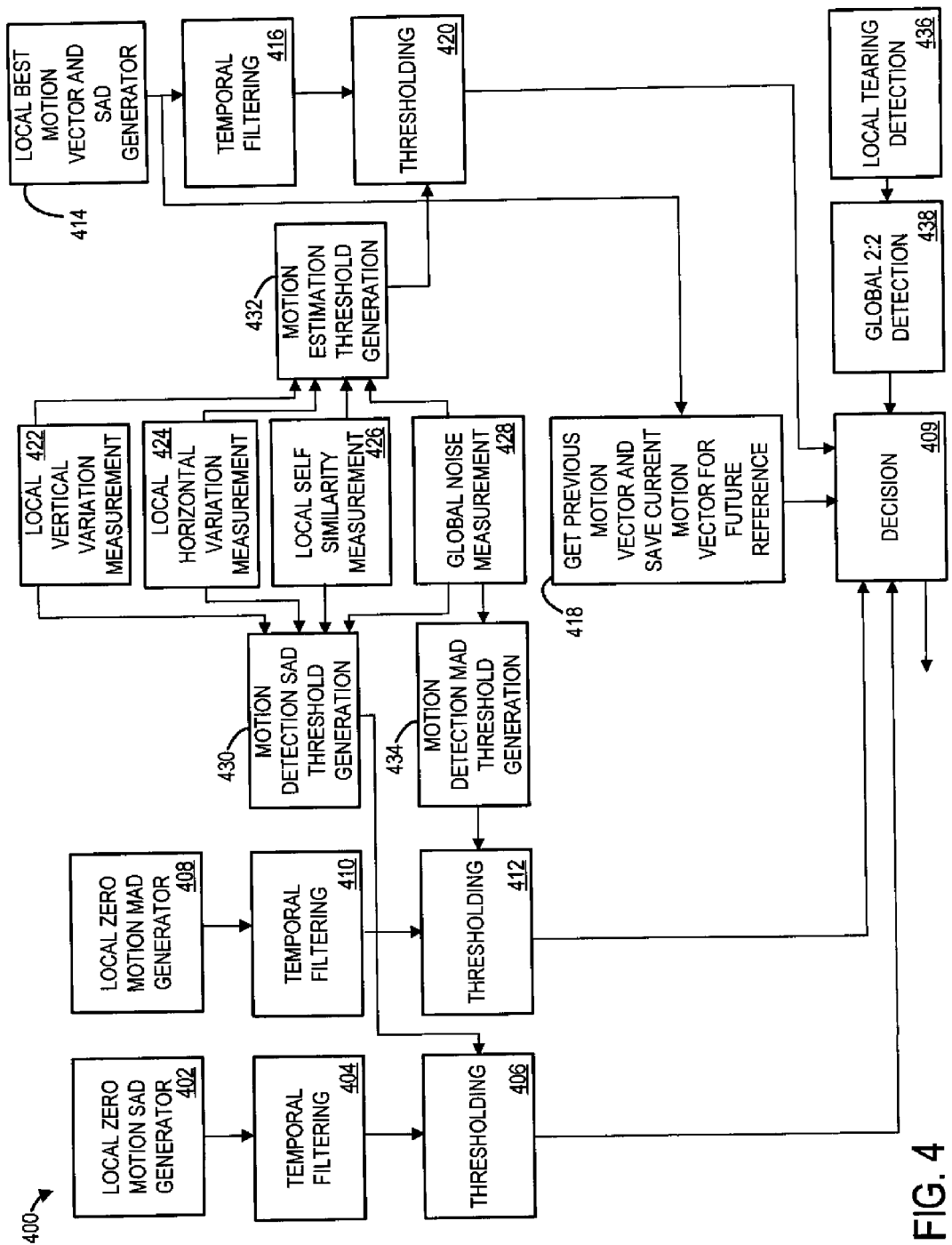
FIG. 4 is a block diagram of an apparatus in accordance with some embodiments.

FIG. 4 is a block diagram of an apparatus 400 that may be used to characterize one or more portions of one or more video signal fields and/or to select one or more types of de-interlacing, in accordance with some embodiments. According to some embodiments, one or more portions of the process illustrated in FIG. 4 may be employed in the process of FIG. 3 and/or the apparatus of FIG. 1.

Referring now to FIG. 4, the apparatus 400 may include an SAD generator 402, which may determine a sum of absolute differences (SAD) between (i) a first group of pixels, or window, in a previous field (sometimes referred to as an N−1th field) and (ii) a group of pixels, or window, in a next field (sometimes referred to as an N+1th field). The first group of pixels may be a rectangular group of pixels in the previous field and centered around the location of the pixel to be interpolated. The second group of pixels may be a rectangular group of pixels in the next field and centered around the location of the pixel to be interpolated.

Figure 5:
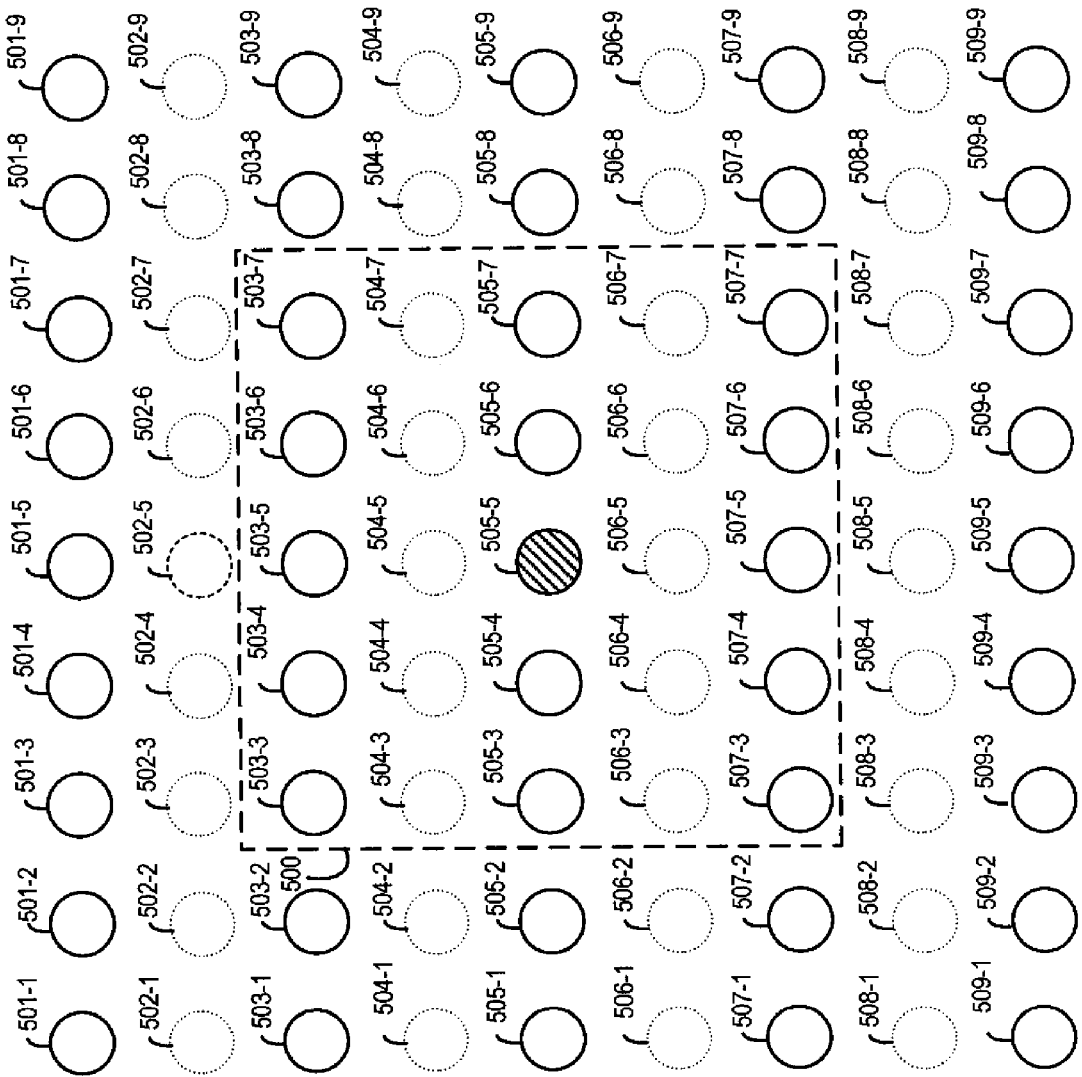
FIG. 5 schematically illustrates an aspect of a process in accordance with some embodiments.

FIG. 5 schematically illustrates a plurality of pixels in a previous field and/or a next field according to some embodiments. Referring to FIG. 5, in some embodiments, the plurality of pixels may include a first line of pixels 501-1 to 501-9, a third line of pixels 503-1 to 503-9, a fifth line of pixels 505-1 to 512-9, a seventh line of pixels 507-1 to 507-9 and a ninth line of pixels 509-1 to 509-9.

The first line of pixels 501-1 to 501-9, the third line of pixels 503-1 to 503-9, the fifth line of pixels 505-1 to 505-9, the seventh line of pixels 507-1 to 507-9 and the ninth line of pixels 509-1 to 509-9 are included in the current field and are thus non interpolated pixels.

A location of a pixel to be interpolated in a current field (FIG. 2) is indicated by hatching. In that regard, the location of the pixel to be interpolated may be the same as the location of pixel 505-5 in the previous field and/or the next field.

Pixels 505-1 to 505-9 are pixels that make up part of a video signal line that includes pixel location 505-5. As stated above, the pixel values for pixels 505-1 to 505-9 are available, since the line that includes those pixels is included in the previous field and the next field. Pixel 505-4 is the pixel that is immediately to the left of pixel 505-5. Pixel 505-3 is the pixel that is immediately to the left of pixel 505-4. Pixel 505-2 is the pixel that is immediately to the left of pixel 505-3. Pixel 505-1 is the pixel that is immediately to the left of pixel 505-2. Pixel 505-6 is the pixel that is immediately to the right of pixel 505-5. Pixel 505-7 is the pixel that is immediately to the right of pixel 505-6. Pixel 505-8 is the pixel that is immediately to the right of pixel 505-7. Pixel 505-9 is the pixel that is immediately to the right of pixel 505-8. As stated above, the pixel values for pixels 505-1 to 505-9 are available, since the line that includes those pixels is included in the previous field and the next field.

Pixels 503-1 to 503-9 are pixels that make up part of a video signal line that is above pixel location 505-5. As stated above, the pixel values for pixels 503-1 to 503-9 are available, since the line that includes those pixels is included in the previous field and the next field. Pixel 503-5 is a pixel that is above the location of the pixel 505-5. Pixel 503-4 is the pixel that is immediately to the left of pixel 503-5. Pixel 503-3 is the pixel that is immediately to the left of pixel 503-4. Pixel 503-2 is the pixel that is immediately to the left of pixel 503-3. Pixel 503-1 is the pixel that is immediately to the left of pixel 503-2. Pixel 503-6 is the pixel that is immediately to the right of pixel 503-5. Pixel 503-7 is the pixel that is immediately to the right of pixel 503-6. Pixel 503-8 is the pixel that is immediately to the right of pixel 503-7. Pixel 503-9 is the pixel that is immediately to the right of pixel 503-8.

Pixels 501-1 to 501-9 are pixels that make up part of a video signal line that is above pixels 502-1 to 502-9. As stated above, the pixel values for pixels 501-1 to 501-9 are available, since the line that includes those pixels is included in the previous field and the next field.

Pixels 507-1 to 507-9 are pixels that make up part of a video signal line that is below pixel location 505-5. As stated above, the pixel values for pixels 507-1 to 507-9 are available, since the line that includes those pixels is included in the previous field and the next field. Pixel 507-5 is a pixel that is below the location of the pixel 505-5. Pixel 507-4 is the pixel that is immediately to the left of pixel 507-5. Pixel 507-3 is the pixel that is immediately to the left of pixel 507-4. Pixel 507-2 is the pixel that is immediately to the left of pixel 507-3. Pixel 507-1 is the pixel that is immediately to the left of pixel 507-2. Pixel 507-6 is the pixel that is immediately to the right of pixel 507-5. Pixel 507-7 is the pixel that is immediately to the right of pixel 507-6. Pixel 507-8 is the pixel that is immediately to the right of pixel 507-7. Pixel 507-9 is the pixel that is immediately to the right of pixel 507-8.

Pixels 509-1 to 509-9 are pixels that make up part of a video signal line that is immediately below pixels 508-1 to 508-9. As stated above, the pixel values for pixels 509-1 to 509-9 are available, since the line that includes those pixels is included in the previous field and the next field.

A rectangular group of pixels 500 may include a subset of the pixels in the previous field and/or the next field. In some such embodiments, the rectangular group of pixels 500 may include a first row of pixels 503-3 to 503-7, a second row of pixels 505-3 to 505-7 and a third row of pixels 507-3 to 507-7. In such embodiments, the rectangular group of pixels 500 may have dimensions of five pixels across (i.e., a width of five pixels) by three pixels down (i.e., a height of three pixels) and may be centered around the location of the pixel to be interpolated.

In some embodiments, the rectangular group of pixels 500 includes only original, non-interpolated pixels in the previous field or next field. That is, in some embodiments, the rectangular group of pixels 500 does not include any pixels from a second line of pixels 502-1 to 502-9, a fourth line of pixels 504-1 to 504-9, a sixth line of pixels 506-1 to 506-9 or an eighth line of pixels a line of pixels 508-1 to 508-9, which are each shown in dotted lines for reference. The second line of pixels 502-1 to 502-9, the fourth line of pixels 504-1 to 504-9, the sixth line of pixels 506-1 to 506-9 and the eighth line of pixels a line of pixels 508-1 to 508-9 are each interpolated pixels for the previous field and/or the next field.

Referring again to FIG. 4, if the rectangular group of pixels in the next field has a width of five pixels and a height of three pixels, and if the rectangular group of pixels in the previous field has a width of five pixels and a height of three pixels, the SAD is determined as the sum of fifteen absolute differences. Each absolute difference may be determined as an absolute difference between a value of a pixel in the rectangular group of pixels in the next field and a value of a corresponding pixel in the rectangular group of pixels in the previous field. The fifteen absolute differences may include: (a) an absolute difference between the value of pixel 503-3 in the next field and the value of pixel 503-3 in the previous field, (b) an absolute difference between the value of pixel 503-4 in the next field and the value of pixel 503-4 in the previous field, (c) an absolute difference between the value of pixel 503-5 in the next field and the value of pixel 503-5 in the previous field, (d) an absolute difference between the value of pixel 503-6 in the next field and the value of pixel 503-6 in the previous field, (e) an absolute difference between the value of pixel 503-7 in the next field and the value of pixel 503-7 in the previous field, (f) an absolute difference between the value of pixel 505-3 in the next field and the value of pixel 505-3 in the previous field, (g) an absolute difference between the value of pixel 505-4 in the next field and the value of pixel 505-4 in the previous field, (h) an absolute difference between the value of pixel 505-5 in the next field and the value of pixel 505-5 in the previous field, (i) an absolute difference between the value of pixel 505-6 in the next field and the value of pixel 505-6 in the previous field, (j) an absolute difference between the value of pixel 505-7 in the next field and the value of pixel 505-7 in the previous field, (k) an absolute difference between the value of pixel 507-3 in the next field and the value of pixel 507-3 in the previous field, (l) an absolute difference between the value of pixel 507-4 in the next field and the value of pixel 507-4 in the previous field, (m) an absolute difference between the value of pixel 507-5 in the next field and the value of pixel 507-5 in the previous field, (n) an absolute difference between the value of pixel 507-6 in the next field and the value of pixel 507-6 in the previous field and (o) an absolute difference between the value of pixel 507-7 in the next field and the value of pixel 507-7 in the previous field.

In such embodiment, the SAD for the pixel in the current field may be determined as follows:

$$\sum_{1 \le i \le 5, 1 \le j \le 3} |P_1(i, j) \text{ next field} - P_1(i, j) \text{ previous field}|$$

where $P_1(i,j)$ next field is the pixel value for the i'th pixel in the j'th row of the rectangular group of pixels in the next field, and $P_1(i,j)$ previous field is the pixel value for the i'th pixel in the j'th row of the rectangular group of pixels in the previous field.

In view of the above, in some embodiments, the SAD generator 402 may not attempt to determine an SAD for a pixel in the first field of a sequence of interlaced video signals, as there may be no previous field available. The SAD for a pixel in the second field may be determined based on a group of pixels in the first field (i.e., a previous field) and a group of pixels in the third field (i.e., a next field). The SAD for a pixel in the third field may be determined based on a group of pixels in the second field (i.e., a previous field) and a group of pixels in the fourth field (i.e., a next field). And so on.

Instead of a rectangular group of pixels having a width of five pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel, namely a pixel in the same location as the pixel to be interpolated, e.g., pixel 505-5.

An output of the SAD generator 402 may supply the SAD generated for the pixel to be interpolated in the current field. The SAD generated for the pixel to be interpolated may be supplied to an input of a filtering block 404, which may filter the SAD to generate a filtered SAD. In some embodiments, the filtering provided by the filtering block 404 may comprise temporal filtering, which may include weighted averaging of two or more SAD's generated for the pixel.

In some embodiments, the filtering block 404 may not attempt to generate a filtered SAD for a pixel in the first field or the second field. In such embodiments, a first filtered SAD may be generated for a pixel in a third field. The first filtered SAD may be determined as a weighted average of the SAD for the pixel in the second field and the SAD for the pixel in the third field. Thereafter, the filtered SAD for a pixel in any given field may be determined as a weighted average of the SAD for the pixel in such field and the filtered SAD for the pixel in the previous field. Thus, the filtered SAD for a pixel in the fourth field may be determined as a weighted average of an SAD for the pixel in the fourth field and the filtered SAD for the pixel in the third field. The filtered SAD for a pixel in the fifth field may be determined as a weighted average of an SAD for the pixel in the fifth field and the filtered SAD for the pixel in the fourth field. And so on.

In some embodiments, a first filtered SAD may be generated for a pixel in the second field. In such embodiments, the first filtered SAD may be equal to the SAD for the pixel in the second field, or a fraction (e.g., one half) thereof. Thereafter, the filtered SAD for a pixel in any given field may be determined as a weighted average of the SAD for the pixel in such field and the filtered SAD for the pixel in the previous field. Thus, the filtered SAD for a pixel in the third field may be determined as a weighted average of an SAD for the pixel in the third field and the filtered SAD for the pixel in the second field. The filtered SAD for a pixel in the fourth field may be determined as a weighted average of an SAD for the pixel in the fourth field and the filtered SAD for the pixel in the third field. The filtered SAD for a pixel in the fifth field may be determined as a weighted average of an SAD for the pixel in the fifth field and the filtered SAD for the pixel in the fourth field. And so on.

In such embodiments, the filtered SAD for the pixel in the fourth and subsequent fields may be determined as follows:

$$a_1(SAD_1(i,j) \text{ current field}) + a_2(\text{filtered SAD previous field})$$

where $a_1$ is a weighting factor, e.g., 0.5

$a_2$ is a weighting factor, e.g., 0.5

$SAD_1(i,j)$ current field is the SAD for the i'th pixel in the j'th row of the current field, and filtered $SAD_1(i,j)$ previous field is the filtered SAD for the i'th pixel in the j'th row of the previous field.

An output of the filtering block 404 may supply the filtered SAD generated for the pixel to be interpolated in the current field. The filtered SAD generated for the pixel to be interpolated may be supplied to an input of a thresholding block 406, which may determine whether the filtered SAD is less than a threshold. In some embodiments, the location of the pixel to be interpolated in the current field may be characterized as having no motion if the filtered SAD is less than the threshold.

An output of the thresholding block 406 may supply a signal indicative of whether the filtered SAD is less than the threshold, which in turn may be supplied to a decision block 409.

The apparatus 400 may further include an MAD generator 408, which may calculate a maximum of absolute differences (MAD) between (i) a first group of pixels, or window, in a previous field and (ii) a second group of pixels, or window, in a next field. The first group of pixels may be a rectangular group of pixels in the previous field and may be centered around the location of the pixel to be interpolated. The second group of pixels may be a rectangular group of pixels in the next field and may centered around the location of the pixel to be interpolated.

Figure 6:
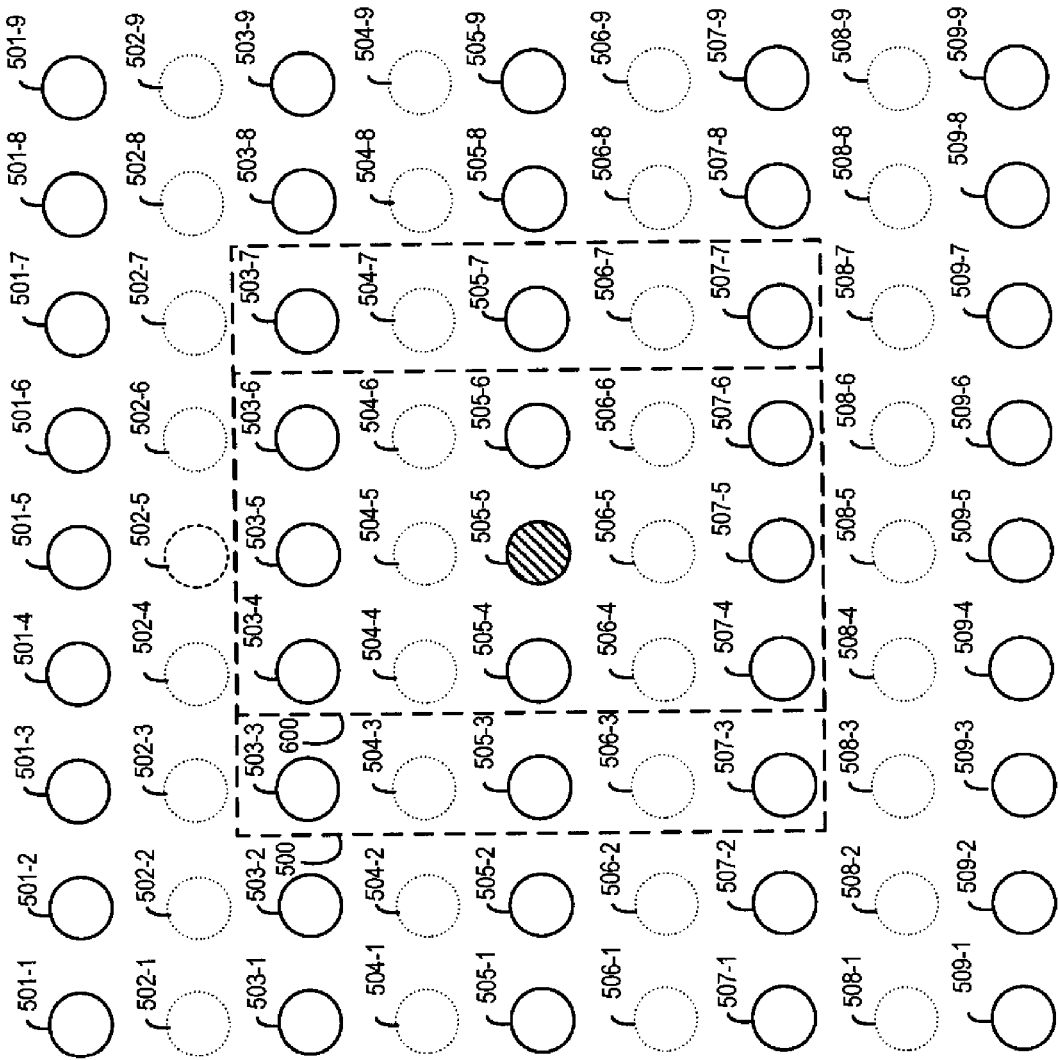
FIG. 6 schematically illustrates an aspect of a process in accordance with some embodiments.

FIG. 6 schematically illustrates a rectangular group of pixels 600 in a previous field and/or a next field according to some embodiments. Referring to FIG. 6, in some embodiments, the rectangular group of pixels 600 may include a subset of the rectangular group of pixels 500, for example pixels 503-4 to 503-6, pixels 505-4 to 505-6 and pixels 507-4 to 507-6. In such embodiments, the rectangular group of pixels 600 may have dimensions of three pixels across by three pixels down and may be centered around the location of the pixel to be interpolated.

In some embodiments, the rectangular group of pixels 600 may include only original, non-interpolated pixels in the previous field or next field. That is, in some embodiments, the rectangular group of pixels 600 does not include any pixels from the second line of pixels 502-1 to 502-9, the fourth line of pixels 504-1 to 504-9, the sixth line of pixels 506-1 to 506-9 or the eighth line of pixels a line of pixels 508-1 to 508-9, which are each shown in dotted lines for reference. As stated above, the second line of pixels 502-1 to 502-9, the fourth line of pixels 504-1 to 504-9, the sixth line of pixels 506-1 to 506-9 and the eighth line of pixels a line of pixels 508-1 to 508-9 are each interpolated pixels for the previous field and/or the next field.

Referring again to FIG. 4, if the rectangular group of pixels in the next field has a width of three pixels and a height of three pixels, and if the rectangular group of pixels in the previous field has a width of three pixels and a height of three pixels, the MAD is determined as the maximum of nine absolute differences. Each absolute difference may be determined as an absolute difference between a value of a pixel in the rectangular group of pixels in the next field and a value of a corresponding pixel in the rectangular group of pixels in the previous field. The nine absolute differences may include: (a) an absolute difference between the value of pixel 503-4 in the next field and the value of pixel 503-4 in the previous field, (b) an absolute difference between the value of pixel 503-5 in the next field and the value of pixel 503-5 in the previous field, (c) an absolute difference between the value of pixel 503-6 in the next field and the value of pixel 503-6 in the previous field, (d) an absolute difference between the value of pixel 505-4 in the next field and the value of pixel 505-4 in the previous field, (e) an absolute difference between the value of pixel 505-5 in the next field and the value of pixel 505-5 in the previous field, (f) an absolute difference between the value of pixel 505-6 in the next field and the value of pixel 505-6 in the previous field, (g) an absolute difference between the value of pixel 507-4 in the next field and the value of pixel 507-4 in the previous field, (h) an absolute difference between the value of pixel 507-5 in the next field and the value of pixel 507-5 in the previous field and (i) an absolute difference between the value of pixel 507-6 in the next field and the value of pixel 507-6 in the previous field.

In such embodiment, the SAD for the pixel in the current field may be determined as follows:

$$\MAX_{1 \leq i \leq 3, 1 \leq j \leq 3}(|P_1(i,j) \text{ next field} - P_1(i,j) \text{ previous field}|)$$

where $P_1(i,j)$ next field is the pixel value for the i'th pixel in the j'th row of the rectangular group of pixels in the next field, and $P_1(i,j)$ previous field is the pixel value for the i'th pixel in the j'th row of the rectangular group of pixels in the previous field.

In view of the above, in some embodiments, MAD generator 406 may not attempt to determine a MAD for a pixel in the first field of a sequence of interlaced video signals, as there may be no previous field available. The MAD for a pixel in the second field may be determined based on a group of pixels in the first field (i.e., a previous field) and a group of pixels in the third field (i.e., a next field). The MAD for a pixel in the third field may be determined based on a group of pixels in the second field (i.e., a previous field) and a group of pixels in the fourth field (i.e., a next field). And so on.

Instead of a rectangular group of pixels having a width of three pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel, namely a pixel in the same location as the pixel to be interpolated, e.g., pixel 505-5.

An output of the MAD generator 408 may supply the MAD generated for the pixel to be interpolated in the current field. The MAD generated for the pixel to be interpolated may be supplied to an input of a filtering block 410, which may filter the MAD to provide a filtered MAD for the pixel to be interpolated in the current field. In some embodiments, such filtering comprises temporal filtering, which may include determining a weighted average of two or more MAD's generated for the pixel.

In some embodiments, the filter block 410 may not attempt to determine a filtered MAD for a pixel in the first field or the second field. In such embodiments, a first filtered MAD may be generated for a pixel in a third field. The first filtered MAD may be determined as a weighted average of the MAD for the pixel in the second field and the MAD for the pixel in the third field. Thereafter, the filtered MAD for a pixel in any given field may be determined as a weighted average of the MAD for the pixel in such field and the filtered MAD for the pixel in the previous field. Thus, the filtered MAD for a pixel in the fourth field may be determined as a weighted average of an MAD for the pixel in the fourth field and the filtered MAD for the pixel in the third field. The filtered MAD for a pixel in the fifth field may be determined as a weighted average of an MAD for the pixel in the fifth field and the filtered MAD for the pixel in the fourth field. And so on.

In some embodiments, a first filtered MAD may be generated for a pixel in the second field. In such embodiments, the first filtered MAD may be equal to the MAD for the pixel in the second field, or a fraction (e.g., one half) thereof. Thereafter, the filtered MAD for a pixel in any given field may be determined as a weighted average of the MAD for the pixel in such field and the filtered MAD for the pixel in the previous field. Thus, the filtered MAD for a pixel in the third field may be determined as a weighted average of an MAD for the pixel in the third field and the filtered MAD for the pixel in the second field. The filtered MAD for a pixel in the fourth field may be determined as a weighted average of an MAD for the pixel in the fourth field and the filtered MAD for the pixel in the third field. The filtered MAD for a pixel in the fifth field may be determined as a weighted average of an MAD for the pixel in the fifth field and the filtered MAD for the pixel in the fourth field. And so on.

In such embodiments, the filtered MAD for the pixel in the fourth and subsequent fields may be determined as follows:

$$a_1(MAD_1(i,j) \text{ current field}) + a_2(\text{filtered MAD previous field})$$

where $a_1$ is a weighting factor, e.g., 0.5

$a_2$ is a weighting factor, e.g., 0.5

$MAD_1(i,j)$ current field is the MAD for the i'th pixel in the j'th row of the current field, and filtered $MAD_1(i,j)$ previous field is the filtered MAD for the i'th pixel in the j'th row of the previous field.

An output of the filtering block 410 may supply the filtered MAD generated for the pixel to be interpolated in the current field. The filtered MAD generated for the pixel to be interpolated may be supplied to an input of a thresholding block 412, which may determine whether the filtered MAD is less than a threshold. In some embodiments, the location of the pixel to be interpolated in the current field may be characterized as having no motion if the filtered MAD is less than the threshold.

An output of the thresholding block 412 may supply a signal indicative of whether the filtered MAD is less than the threshold, which in turn may be supplied to the decision block 409.

The apparatus 400 may further include a best motion vector and SAD generator 414, which may calculate at least one motion SAD between (i) a first group of pixels in a previous field and (ii) a second group of pixels in a next field. As with the SAD calculated above, the second group of pixels may be a rectangular group of pixels centered around the location of the pixel to be interpolated. However, unlike the SAD calculated above, the first group of pixels may be a rectangular group of pixels centered around a location that is offset from the location of the pixel to be interpolated. The offset may be based at least in part on a motion vector. In some embodiments, a plurality of motion vectors may be defined and the best motion and SAD generator 414 may calculate a different motion SAD for each such motion vector.

Figure 7:
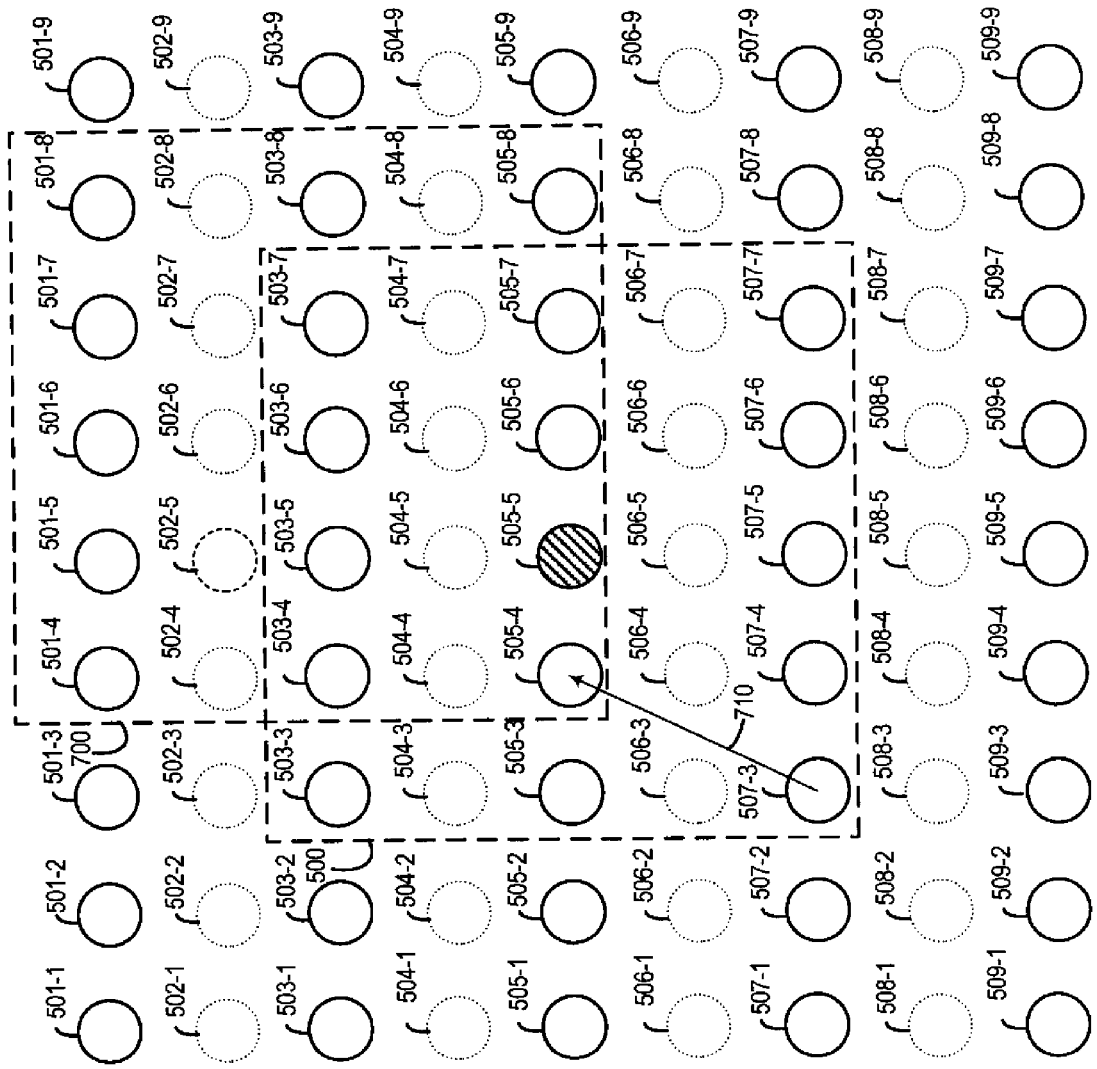
FIG. 7 schematically illustrates an aspect of a process in accordance with some embodiments.

FIG. 7 schematically illustrates a rectangular group of pixels 700 in a previous field according to some embodiments. Referring to FIG. 7, in some embodiments, the rectangular group of pixels 700 may include a subset of the pixels in the previous field, for example pixels 503-4 to 503-6, pixels 505-4 to 505-6 and pixels 507-4 to 507-6. In such embodiments, the rectangular group of pixels 600 may have dimensions of three pixels across by three pixels down.

In some embodiments, the rectangular group of pixels 700 includes only original, non-interpolated pixels in the previous field. That is, in some embodiments, the rectangular group of pixels 700 does not include any pixels from the second line of pixels 502-1 to 502-9, the fourth line of pixels 504-1 to 504-9, the sixth line of pixels 506-1 to 506-9 or the eighth line of pixels a line of pixels 508-1 to 508-9, which are each shown in dotted lines for reference. As stated above, the second line of pixels 502-1 to 502-9, the fourth line of pixels 504-1 to 504-9, the sixth line of pixels 506-1 to 506-9 and the eighth line of pixels a line of pixels 508-1 to 508-9 are each interpolated pixels for the previous field and/or the next field.

The rectangular group of pixels 700 may be centered around a location that is offset from the location of the pixel to be interpolated, indicated by hatching. The offset may be defined by a motion vector 710. In some embodiments, the motion vector 710 may have horizontal and vertical components equal to one pixel right and one pixel up, respectively.

Referring again to FIG. 4, if the rectangular group of pixels in the next field has a width of five pixels and a height of three pixels, if the rectangular group of pixels in the previous field has a width of five pixels and a height of three pixels, and if the motion vector has components of one pixel right and one pixel up, the motion SAD is determined as the sum of fifteen absolute differences. Each absolute difference may be determined as an absolute difference between a value of a pixel in the rectangular group of pixels in the next field and a value of a corresponding pixel in the rectangular group of pixels in the previous field. The fifteen absolute differences may include:

(a) an absolute difference between the value of pixel 503-3 in the next field and the value of pixel 501-4 in the previous field,
(b) an absolute difference between the value of pixel 503-4 in the next field and the value of pixel 501-5 in the previous field,
(c) an absolute difference between the value of pixel 503-5 in the next field and the value of pixel 501-6 in the previous field,
(d) an absolute difference between the value of pixel 503-6 in the next field and the value of pixel 501-7 in the previous field,
(e) an absolute difference between the value of pixel 503-7 in the next field and the value of pixel 501-8 in the previous field,
(f) an absolute difference between the value of pixel 505-3 in the next field and the value of pixel 503-4 in the previous field, and so on.

In such embodiment, the motion SAD for the pixel in the current field may be determined as follows:

$$\sum_{1 \leq i \leq 5, 1 \leq j \leq 3} |P_1(i,j) \text{ next field} - P_1(i+k, j+1) \text{ previous field}|$$

where $P_1(i,j)$ next field is the pixel value for the i'th pixel in the j'th row of the rectangular group of pixels in the next field, $P_1(i+k,j+1)$ previous field is the pixel value for the i'th pixel in the j'th row of the rectangular group of pixels in the previous field, k is the column component of the motion vector, and l is the row component of the motion vector.

In some embodiments, the best motion vector and SAD generator 414 may not attempt to determine a motion SAD for a pixel in the first field of a sequence of interlaced video signals, as there may be no previous field available. The motion SAD for a pixel in the second field may be determined based on a group of pixels in the first field (i.e., a previous field) and a group of pixels in the third field (i.e., a next field). The motion SAD for a pixel in the third field may be determined based on a group of pixels in the second field (i.e., a previous field) and a group of pixels in the fourth field (i.e., a next field). And so on.

Instead of a rectangular group of pixels having a width of five pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel.

As stated above, in some embodiments, a plurality of motion vectors may be defined and a different motion SAD may be determined for each such motion vector.

In some embodiments, fifteen motion vectors may be defined as follows:

```
 0, 0    0, 1    0, -1
 1, 0    1, 1    1, -1
 2, 0    2, 1    2, -1
-1, 0   -1, 1   -1, -1
-2, 0   -2, 1   -2, -1
```

In such embodiments, fifteen motion SAD's may be computed for each pixel to be interpolated. Each motion SAD may be determined with the rectangular group of pixels in the previous field centered around a location that is offset from the location of the pixel to be interpolated, in accordance with a corresponding motion vector. The fifteen motion SAD's computed for a pixel to be interpolated may include (a) a motion SAD computed with the rectangular group of pixels in the previous field centered around a location offset (from the location of the pixel to be interpolated) in accordance with the motion vector 0, 0, (b) a motion SAD computed with the rectangular group of pixels in the previous field centered around a location offset in accordance with the motion vector 0, 1, (c) a motion SAD computed with the rectangular group of pixels in the previous field centered around a location offset in accordance with the motion vector 0, −1, (d) a motion SAD computed with the rectangular group of pixels in the previous field centered around a location offset in accordance with the motion vector 1, 0, (e) a motion SAD computed with the rectangular group of pixels in the previous field centered around a location offset by the motion vector 1, 1, and so on.

In some embodiments, the best motion vector and SAD generator 414 further determines a best motion SAD for the pixel to be interpolated in the current field. The best motion SAD may be based at least in part on the one or more motion SAD's generated for the pixel to be interpolated. In some embodiments, the best motion SAD may be defined as the motion SAD with the smallest magnitude.

An output of the best motion vector and SAD generator 414 may supply the best motion SAD generated for the pixel to be interpolated in the current field. In some embodiments, an output of the best motion vector and SAD generator 414 may supply the best motion vector corresponding to the best motion SAD. The best motion vector may be supplied to a memory and/or storage block 418.

The best motion SAD may be supplied to an input of a filtering block 416, which may filter the best motion SAD generated for a pixel in a current field to provide a filtered best motion SAD. In some embodiments, the filtering may comprise temporal filtering, which may include weighted averaging of two or more best motion SAD's generated for the pixel.

In some embodiments, the filtering block 416 may not attempt to determine a filtered best motion SAD for a pixel in the first field or the second field. In such embodiments, a first filtered best motion SAD may be generated for a pixel in a third field. The first filtered best motion SAD may be determined as a weighted average of the SAD for the pixel in the second field and the SAD for the pixel in the third field. Thereafter, the filtered best motion SAD for a pixel in any given field may be determined as a weighted average of the SAD for the pixel in such field and the filtered best motion SAD for the pixel in the previous field. Thus, the filtered best motion SAD for a pixel in the fourth field may be determined as a weighted average of an SAD for the pixel in the fourth field and the filtered best motion SAD for the pixel in the third field. The filtered best motion SAD for a pixel in the fifth field may be determined as a weighted average of an SAD for the pixel in the fifth field and the filtered best motion SAD for the pixel in the fourth field. And so on.

In some embodiments, a first filtered best motion SAD may be generated for a pixel in the second field. In such embodiments, the first filtered best motion SAD may be equal to the SAD for the pixel in the second field, or a fraction (e.g., one half) thereof. Thereafter, the filtered best motion SAD for a pixel in any given field may be determined as a weighted average of the SAD for the pixel in such field and the filtered best motion SAD for the pixel in the previous field. Thus, the filtered best motion SAD for a pixel in the third field may be determined as a weighted average of an SAD for the pixel in the third field and the filtered best motion SAD for the pixel in the second field. The filtered best motion SAD for a pixel in the fourth field may be determined as a weighted average of an SAD for the pixel in the fourth field and the filtered best motion SAD for the pixel in the third field. The filtered best motion SAD for a pixel in the fifth field may be determined as a weighted average of an SAD for the pixel in the fifth field and the filtered best motion SAD for the pixel in the fourth field. And so on.

In such embodiments, the filtered best motion SAD for the pixel in the fourth and subsequent fields may be determined as follows:

$$a_1(SAD_1(i,j) \text{ current field}) + a_2(\text{filtered best motion SAD previous field})$$

where $a_1$ is a weighting factor, e.g., 0.5

$a_2$ is a weighting factor, e.g., 0.5

$SAD_1(i,j)$ current field is the SAD for the i'th pixel in the j'th row of the current field, and filtered best motion $SAD_1(i,j)$ previous field is the filtered best motion SAD for the i'th pixel in the j'th row of the previous field.

An output of the filtering block 416 may supply the filtered best motion SAD generated for the pixel to be interpolated in the current field. The filtered best motion SAD may be supplied to an input of a thresholding block 420, which may determine whether the filtered best motion SAD is less than a threshold.

An output of the thresholding block 420 may supply a signal indicative of whether the filtered best motion SAD is less than the threshold, which in turn may be supplied to the decision block 409. In some embodiments, the location of the pixel to be interpolated in the current field may be characterized as having fast motion or fast moving if (a) the filtered best motion SAD is less than the threshold and (b) the current best motion vector is equal to a previous best motion vector.

The apparatus 400 may further include a local vertical variation measurement block 422, a local horizontal variation measurement block 424, a local self similarity block 426 and a global noise measurement block 428. In some such embodiments, one or more of such blocks may be used in generating one or more thresholds, which may be supplied to one or more of the thresholding blocks 406, 412, 420.

In that regard, the local vertical variation measurement block 422 may determine a local vertical variation in the current field for a pixel to be interpolated, which may be determined as a sum of absolute differences (SAD) between (i) a first group of pixels in the current field and (ii) a second group of pixels in the current field. The first group of pixels may be a rectangular group of pixels centered around the location of the pixel immediately above the pixel to be interpolated. The second group of pixels may be a rectangular group of pixels centered around the location of the pixel immediately below the pixel to be interpolated.

Figure 9:
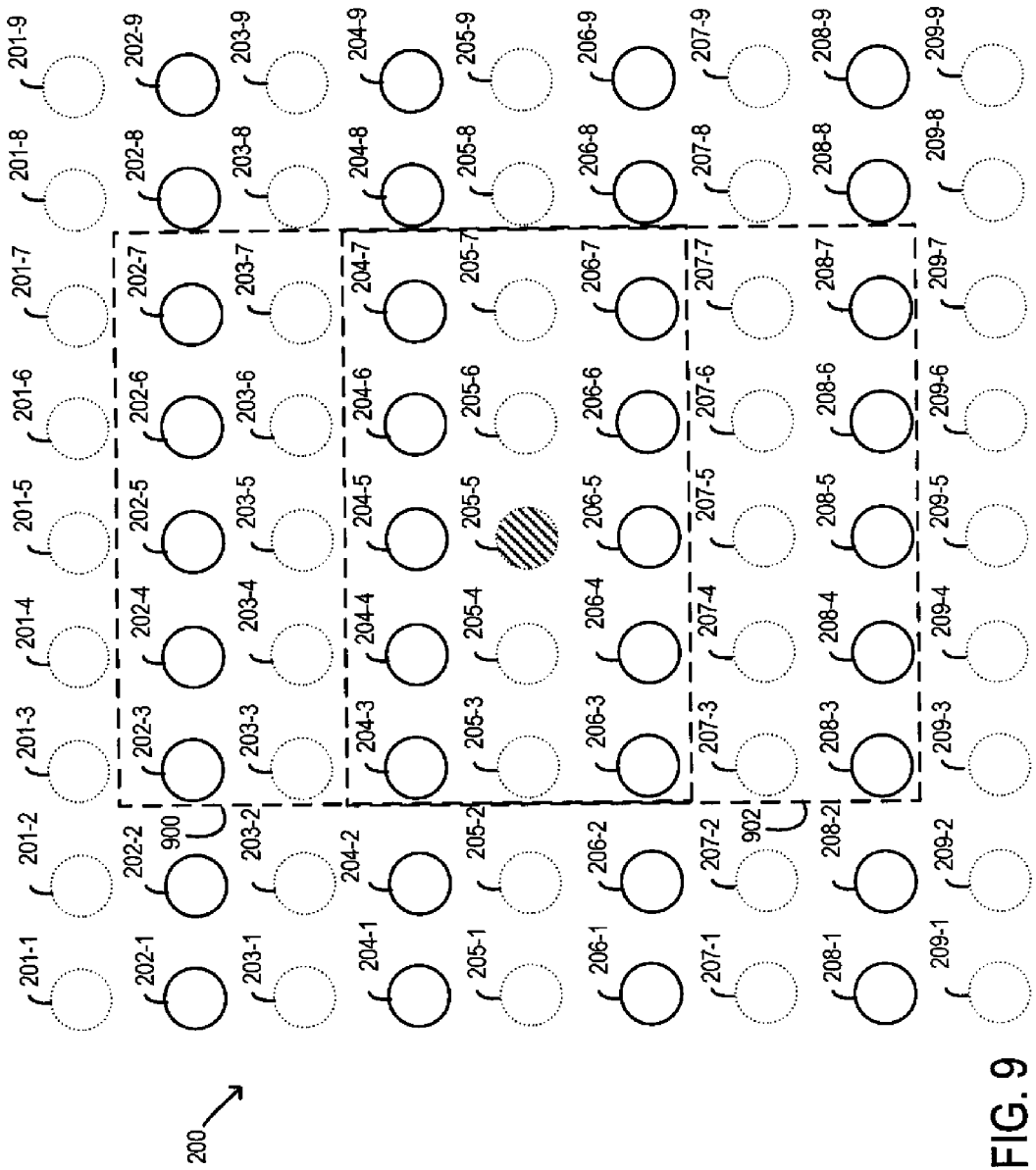
FIG. 9 schematically illustrates an aspect of a process in accordance with some embodiments.

FIG. 9 schematically illustrates a first rectangular group of pixels 900 and a second group of pixels 902 in a previous field according to some embodiments. Referring to FIG. 9, in some embodiments, a first rectangular group of pixels 900 and a second rectangular group of pixels 902 may each include a subset of the pixels in the current field. In some embodiments, the first rectangular group of pixels 900 may include a first row of pixels 202-3 to 202-7, a second row of pixels 204-3 to 204-7 and a third row of pixels 206-3 to 206-7. The second rectangular group of pixels 902 may include a first row of pixels 204-3 to 204-7, a second row of pixels 206-3 to 206-7 and a third row of pixels 208-3 to 208-7. In such embodiments, the first rectangular group of pixels 900 and the second rectangular group of pixels 902 may each have dimensions of five pixels across by three pixels down.

In some embodiments, the first rectangular group of pixels 900 and the second rectangular group of pixels 902 may each include only original, non-interpolated pixels in the previous field. That is, in some embodiments, the first rectangular group of pixels 900 and the second rectangular group of pixels do not include any pixels from the first line of pixels 201-1 to 201-9, the third line of pixels 203-1 to 203-9, the fifth line of pixels 205-1 to 205-9, the seventh line of pixels 207-1 to 207-9 or the ninth line of pixels 209-1 to 209-9, which are each shown in dotted lines for reference.

The first rectangular group of pixels 900 may be centered around the location of pixel 204-5, which may be immediately below the location of the pixel to be interpolated. The second rectangular group of pixels 902 may be centered around the location of the pixel 206-5, which may be immediately below the location of the pixel to be interpolated.

If the first rectangular group of pixels 900 and the second rectangular group of pixels 902 each have a width of five pixels and a height of three pixels, the local vertical variation in the current field for the pixel being interpolated may be determined as the sum of fifteen absolute differences. Each absolute difference may be determined as an absolute difference between a value of a pixel in the first rectangular group of pixels and a value of a corresponding pixel in the second rectangular group of pixels. The fifteen absolute differences may include: (a) an absolute difference between the value of pixel 202-3 in the current field and the value of pixel 204-3 in the current field, (b) an absolute difference between the value of pixel 202-4 in the current field and the value of pixel 204-4 in the current field, (c) an absolute difference between the value of pixel 202-5 in the current field and the value of pixel 204-5 in the current field, (d) an absolute difference between the value of pixel 202-6 in the current field and the value of pixel 204-6 in the current field, (e) an absolute difference between the value of pixel 202-7 in the current field and the value of pixel 204-7 in the current field, (f) an absolute difference between the value of pixel 204-3 in the current field and the value of pixel 206-3 in the current field, and so on.

In such embodiment, the local vertical variation in the current field for the pixel to be interpolated may be determined as follows:

$$\sum_{1 \le i \le 5, 1 \le j \le 3} |P_1(i, j+1) \text{ current field} - P_1(i, j-1) \text{ current field}|$$

where $P_1(i,j+1)$ current field is the pixel value for the i'th pixel in the j'th row of the first rectangular group of pixels in the current field, $P_1(i,j-1)$ current field is the pixel value for the i'th pixel in the j'th row of the second rectangular group of pixels in the current field, and 1 is the row component of the offset from the location of the pixel to be interpolated.

Instead of a rectangular group of pixels having a width of five pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel.

In some embodiments, the local vertical variation measurement block 422 may further determine a first local vertical variation in the previous field for the pixel to be interpolated. In some embodiments, the first local vertical variation in the previous field may be determined as a sum of absolute differences (SAD) between (i) a first group of pixels in the previous field and (ii) a second group of pixels in the previous field. The first group of pixels may be a rectangular group of pixels centered around the location of the pixel to be interpolated. The second group of pixels may be a rectangular group of pixels centered around the location of a pixel above the pixel to be interpolated.

Figure 10:
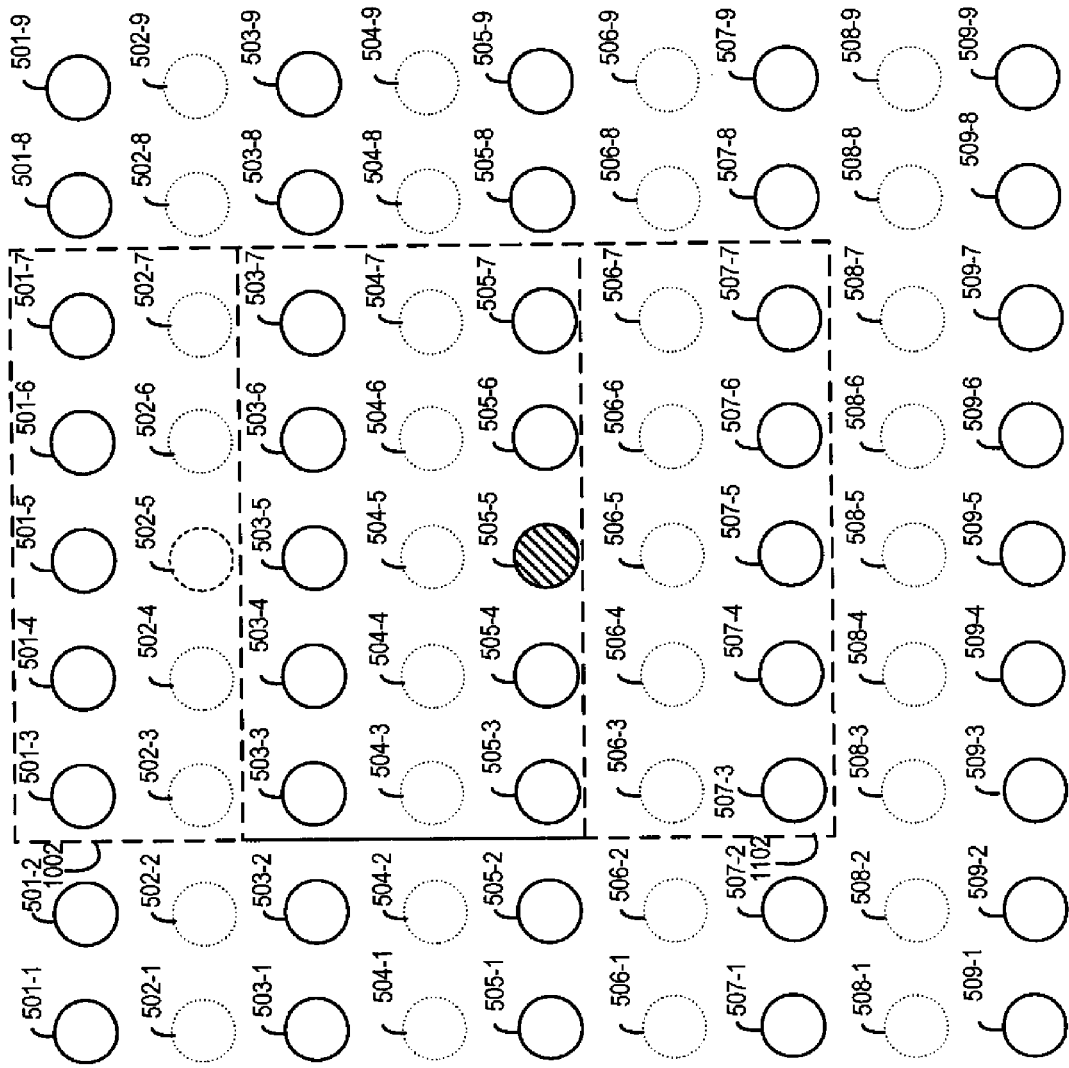
FIG. 10 schematically illustrates an aspect of a process in accordance with some embodiments.

FIG. 10 schematically illustrates the first rectangular group of pixels 1000 in the previous field and a second rectangular group of pixels 1002 in a previous field according to some embodiments. Referring to FIG. 10, in some embodiments, a first rectangular group of pixels 1000 and a second rectangular group of pixels 1002 may each include a subset of the pixels in the previous field. In some embodiments, the first rectangular group of pixels 1000 may include a first row of pixels 503-3 to 503-7, a second row of pixels 505-3 to 505-7 and a third row of pixels 506-3 to 506-7. The second rectangular group of pixels 1002 may include a first row of pixels 501-3 to 501-7, a second row of pixels 503-3 to 503-7 and a third row of pixels 505-3 to 505-7. In such embodiments, the first rectangular group of pixels 1000 and the second rectangular group of pixels 1002 may each have dimensions of five pixels across by three pixels down.

In some embodiments, the first rectangular group of pixels 1000 and the second rectangular group of pixels 1002 may each include only original, non-interpolated pixels in the previous field. That is, in some embodiments, the first rectangular group of pixels 1000 and the second rectangular group of pixels do not include any pixels from a second line of pixels 502-1 to 502-9, a fourth line of pixels 504-1 to 504-9, a sixth line of pixels 506-1 to 506-9 or an eighth line of pixels a line of pixels 508-1 to 508-9, which are each shown in dotted lines for reference.

If the first rectangular group of pixels 1000 and the second rectangular group of pixels 1002 each have a width of five pixels and a height of three pixels, the first local vertical variation in the previous frame for the pixel to be interpolated may be determined as the sum of fifteen absolute differences. Each absolute difference may be determined as an absolute difference between a value of a pixel in the first rectangular group of pixels and a value of a corresponding pixel in the second rectangular group. The fifteen absolute differences may include: (a) an absolute difference between the value of pixel 503-3 in the previous field and the value of pixel 501-3 in the previous field, (b) an absolute difference between the value of pixel 503-4 in the previous field and the value of pixel 501-4 in the previous field, (c) an absolute difference between the value of pixel 503-5 in the previous field and the value of pixel 501-5 in the previous field, (d) an absolute difference between the value of pixel 503-6 in the previous field and the value of pixel 501-6 in the previous field, (e) an absolute difference between the value of pixel 503-7 in the previous field and the value of pixel 501-7 in the previous field, (f) an absolute difference between the value of pixel 505-3 in the previous field and the value of pixel 503-3 in the previous field, and so on.

In such embodiment, the first local vertical variation in the current field for the pixel to be interpolated may be determined as follows:

$$\sum_{1 \le i \le 5, 1 \le j \le 3} |P_1(i, j) \text{ previous field} - P_1(i, j-1) \text{ previous field}|$$

where $P_1(i,j)$ previous field is the pixel value for the i'th pixel in the j'th row of the first rectangular group of pixels in the previous field, $P_1(i,j-1)$ previous field is the pixel value for the i'th pixel in the j'th row of the second rectangular group of pixels in the previous field, and l is the row component of the offset from the location of the pixel to be interpolated.

Instead of a rectangular group of pixels having a width of five pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel.

In some embodiments, the local vertical variation measurement block 422 may further determine a second local vertical variation in the previous field for the pixel to be interpolated. In some embodiments, the second local vertical variation in the previous field may be determined as a sum of absolute differences (SAD) between (i) a first group of pixels in the previous field and (ii) a second group of pixels in the previous field. The first group of pixels may be a rectangular group of pixels centered around the location of the pixel to be interpolated. The second group of pixels may be a rectangular group of pixels centered around the location of a pixel below the pixel to be interpolated.

Figure 11:
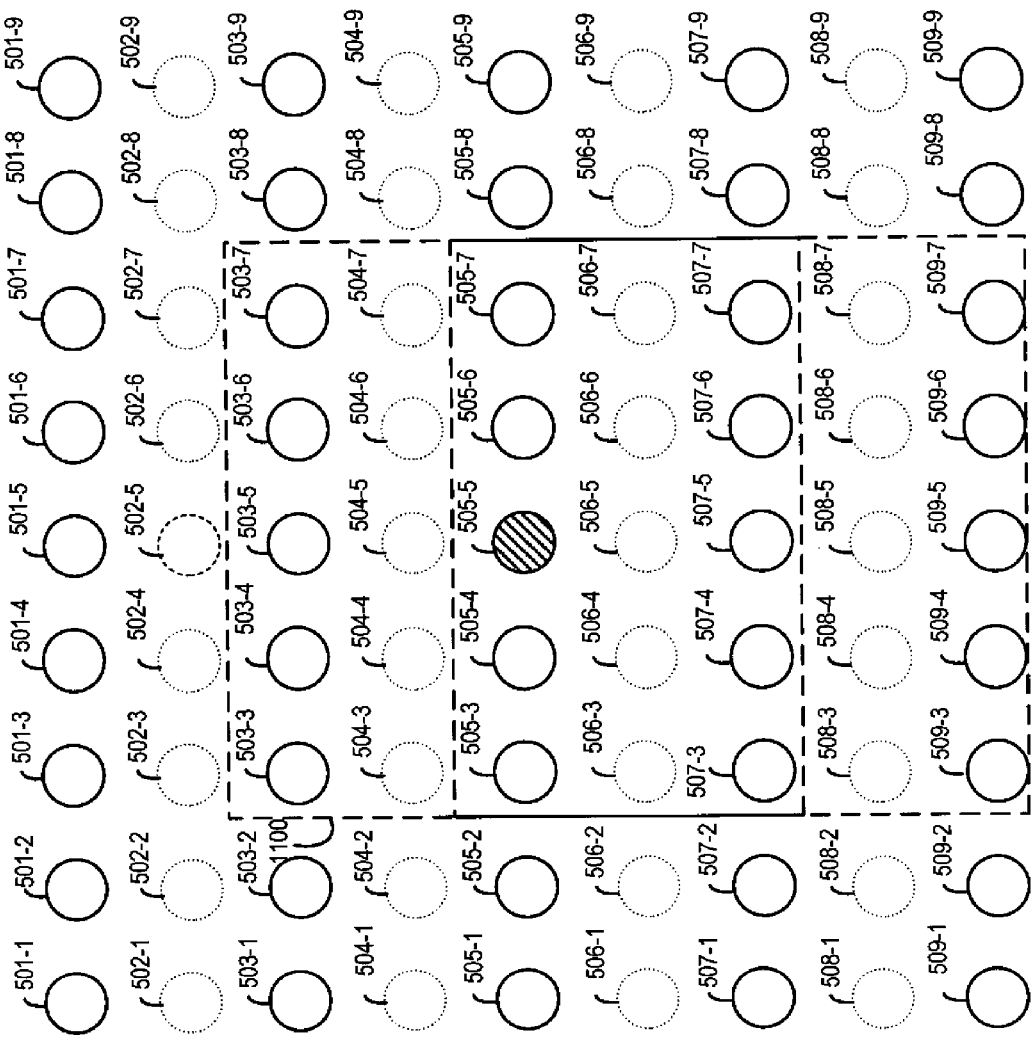
FIG. 11 schematically illustrates an aspect of a process in accordance with some embodiments.

FIG. 11 schematically illustrates the first rectangular group of pixels 1100 in the previous field and a second rectangular group of pixels 1102 in a previous field according to some embodiments. Referring to FIG. 11, in some embodiments, a first rectangular group of pixels 1100 and a second rectangular group of pixels 1102 may each include a subset of the pixels in the previous field. In some embodiments, the first rectangular group of pixels 1100 may include a first row of pixels 503-3 to 503-7, a second row of pixels 505-3 to 505-7 and a third row of pixels 506-3 to 506-7. The second rectangular group of pixels 1102 may include a first row of pixels 501-3 to 501-7, a second row of pixels 503-3 to 503-7 and a third row of pixels 505-3 to 505-7. In such embodiments, the first rectangular group of pixels 1100 and the second rectangular group of pixels 1102 may each have dimensions of five pixels across by three pixels down.

In some embodiments, the first rectangular group of pixels 1100 and the second rectangular group of pixels 1102 may each include only original, non-interpolated pixels in the previous field. That is, in some embodiments, the first rectangular group of pixels 1100 and the second rectangular group of pixels do not include any pixels from a second line of pixels 502-1 to 502-9, a fourth line of pixels 504-1 to 504-9, a sixth line of pixels 506-1 to 506-9 or an eighth line of pixels a line of pixels 508-1 to 508-9, which are each shown in dotted lines for reference.

If the first rectangular group of pixels 1100 and the second rectangular group of pixels 1102 each have a width of five pixels and a height of three pixels, the second local vertical variation in the previous frame for the pixel to be interpolated may be determined as the sum of fifteen absolute differences. Each absolute difference may be determined as an absolute difference between a value of a pixel in the first rectangular group of pixels and a value of a corresponding pixel in the second rectangular group of pixels. The fifteen absolute differences may include: (a) an absolute difference between the value of pixel 503-3 in the previous field and the value of pixel 505-3 in the previous field, (b) an absolute difference between the value of pixel 503-4 in the previous field and the value of pixel 505-4 in the previous field, (c) an absolute difference between the value of pixel 503-5 in the previous field and the value of pixel 505-5 in the previous field, (d) an absolute difference between the value of pixel 503-6 in the previous field and the value of pixel 505-6 in the previous field, (e) an absolute difference between the value of pixel 503-7 in the previous field and the value of pixel 505-7 in the previous field, (f) an absolute difference between the value of pixel 505-3 in the previous field and the value of pixel 507-3 in the previous field, and so on.

In such embodiment, the first local vertical variation in the current field for the pixel to be interpolated may be determined as follows:

$$\sum_{1 \le i \le 5, 1 \le j \le 3} |P_1(i, j) \text{ previous field} - P_1(i, j+1) \text{ previous field}|$$

where $P_1(i,j)$ previous field is the pixel value for the i'th pixel in the j'th row of the first rectangular group of pixels in the previous field, $P_1(i,j-1)$ previous field is the pixel value for the i'th pixel in the j'th row of the second rectangular group of pixels in the previous field, and l is the row component of the offset from the location of the pixel to be interpolated.

Instead of a rectangular group of pixels having a width of five pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel.

In some embodiments, the local vertical variation measurement block 422 may determine a local vertical variation for the pixel to be interpolated. In some embodiments, the local vertical variation for the pixel to be interpolated is defined as the minimum of the local vertical variation in the current field for the pixel to be interpolated, the first vertical variation in the previous field for the pixel to be interpolated and the second vertical variation in the previous field for the pixel to be interpolated.

Referring again to FIG. 4, an output of the local vertical variation measurement block 422 may supply the local vertical variation for the pixel to be interpolated in the current field, which may be supplied to a motion detection SAD threshold generator block 430 and a motion estimation threshold generator block 432, further described hereinafter.

The local horizontal variation measurement block 424 may determine a local horizontal variation for a pixel to be interpolated. In some embodiments, the local vertical variation may be determined as a sum of absolute differences (SAD) between (i) a first group of pixels in the current field and (ii) a second group of pixels in the current field. The first group of pixels may be a rectangular group of pixels centered around the location of the pixel immediately left of the pixel to be interpolated. The second group of pixels may be a rectangular group of pixels centered around the location of the pixel immediately right of the pixel to be interpolated.

Figure 12:
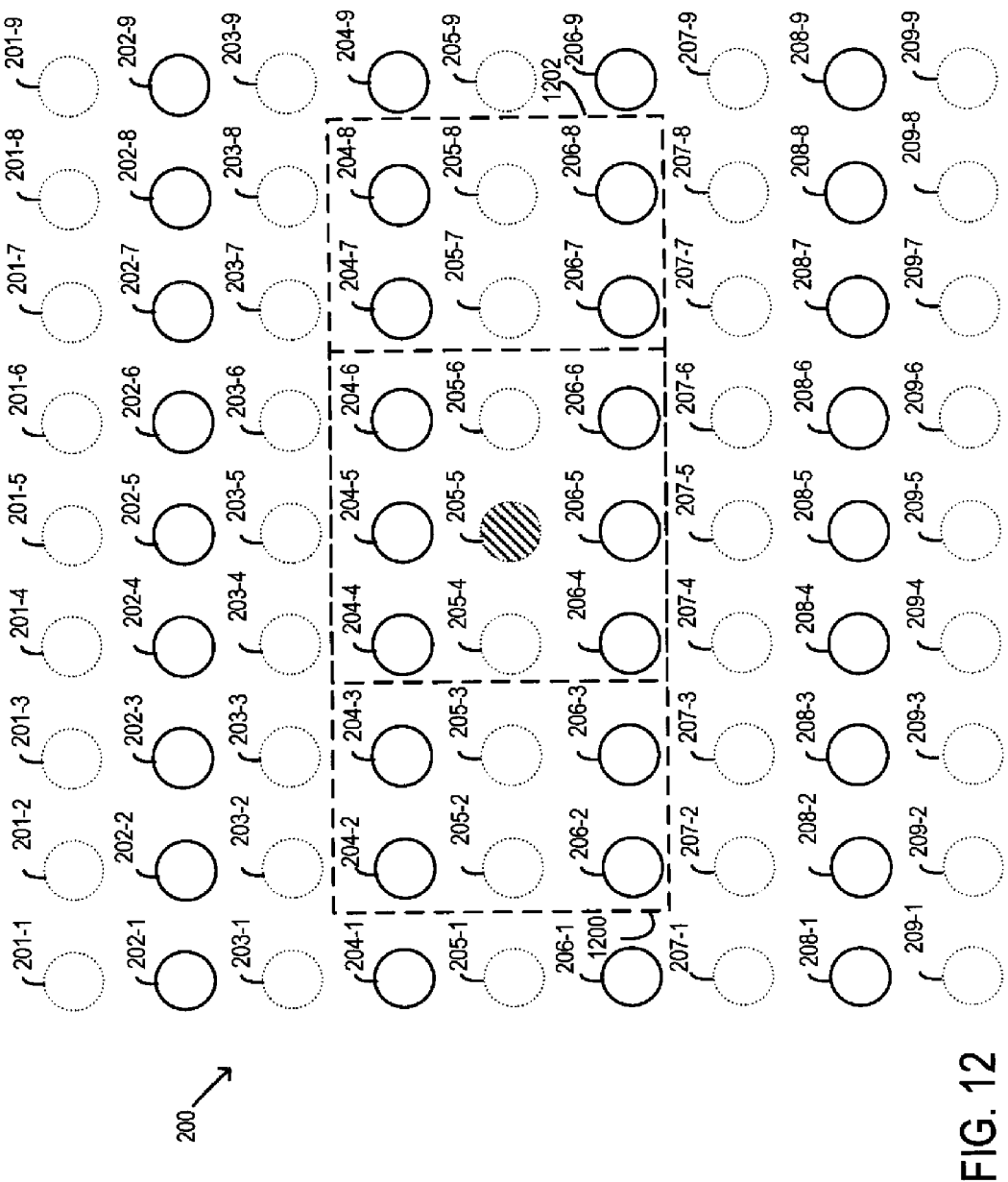
FIG. 12 schematically illustrates an aspect of a process in accordance with some embodiments.

FIG. 12 schematically illustrates a first rectangular group of pixels 1200 and a second group of pixels 1202 in a current field according to some embodiments. Referring to FIG. 12, in some embodiments, a first rectangular group of pixels 1200 and a second rectangular group of pixels 1202 may each include a subset of the pixels in the current field. In some embodiments, the first rectangular group of pixels 1200 may include a first row of pixels 204-2 to 204-6 and a second row of pixels 206-2 to 206-6. The second rectangular group of pixels 1202 may include a first row of pixels 204-4 to 204-8 and a second row of pixels 206-4 to 206-8. In such embodiments, the first rectangular group of pixels 1200 and the second rectangular group of pixels 1202 may each have dimensions of five pixels across by two pixels down.

In some embodiments, the first rectangular group of pixels 1200 and the second rectangular group of pixels 1202 may each include only original, non-interpolated pixels in the previous field. That is, in some embodiments, the first rectangular group of pixels 1200 and the second rectangular group of pixels 1202 do not include any pixels from the first line of pixels 201-1 to 201-9, the third line of pixels 203-1 to 203-9, the fifth line of pixels 205-1 to 205-9, the seventh line of pixels 207-1 to 207-9 or the ninth line of pixels 209-1 to 209-9, which are each shown in dotted lines for reference.

The first rectangular group of pixels 1200 may be centered around the location of pixel 205-4, which may be immediately left of the location of the pixel to be interpolated. The second rectangular group of pixels 1202 may be centered around the location of the pixel 205-6, which may be immediately right of the location of the pixel to be interpolated.

If the first rectangular group of pixels 1200 and the second rectangular group of pixels 1202 each have a width of five pixels and a height of two pixels, the local horizontal variation in the current field for the pixel being interpolated may be determined as the sum of ten absolute differences. Each absolute difference may be determined as an absolute difference between a value of a pixel in the first rectangular group of pixels and a value of a corresponding pixel in the second rectangular group of pixels. The ten absolute differences may include: (a) an absolute difference between the value of pixel 204-2 in the current field and the value of pixel 204-4 in the current field, (b) an absolute difference between the value of pixel 204-3 in the current field and the value of pixel 204-5 in the current field, (c) an absolute difference between the value of pixel 204-4 in the current field and the value of pixel 204-6 in the current field, (d) an absolute difference between the value of pixel 204-5 in the current field and the value of pixel 204-7 in the current field, (e) an absolute difference between the value of pixel 204-6 in the current field and the value of pixel 204-8 in the current field, (f) an absolute difference between the value of pixel 206-2 in the current field and the value of pixel 206-4 in the current field, and so on.

In such embodiment, the local horizontal variation in the current field for the pixel to be interpolated may be determined as follows:

$$\sum_{1 \le i \le 5, 1 \le j \le 3} |P_1(i+k, j) \text{ current field} - P_1(i-k, j) \text{ current field}|$$

where $P_1(i+k,j)$ current field is the pixel value for the i'th pixel in the j'th row of the first rectangular group of pixels in the current field, $P_1(i-k,j)$ current field is the pixel value for the i'th pixel in the j'th row of the second rectangular group of pixels in the current field, and k is the row component of the offset from the location of the pixel to be interpolated.

Instead of a rectangular group of pixels having a width of five pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel.

Referring again to FIG. 4, an output of the local horizontal measurement block 424 may supply the local horizontal variation for the pixel to be interpolated in the current field, which may be supplied to the motion detection SAD threshold generator block 430 and the motion estimation threshold generator block 432, further described hereinafter.

The local self similarity measurement block 426 may determine a local self similarity for a pixel to be interpolated. In some embodiments, the local self similarity may be determined as a sum of absolute differences (SAD) between (i) a first group of pixels in the current field and (ii) a second group of pixels in the current field. The first group of pixels may be a rectangular group of pixels centered around the location of the pixel to be interpolated. The second group of pixels may be a rectangular group of pixels centered around a location offset horizontally from the location of the pixel to be interpolated. The offset may be based at least in part on a horizonatal offset vector. In some embodiments, a plurality of horizontal offset vectors may be defined and the process may calculate a different local self similarity for each such horizontal offset vector.

Figure 13:
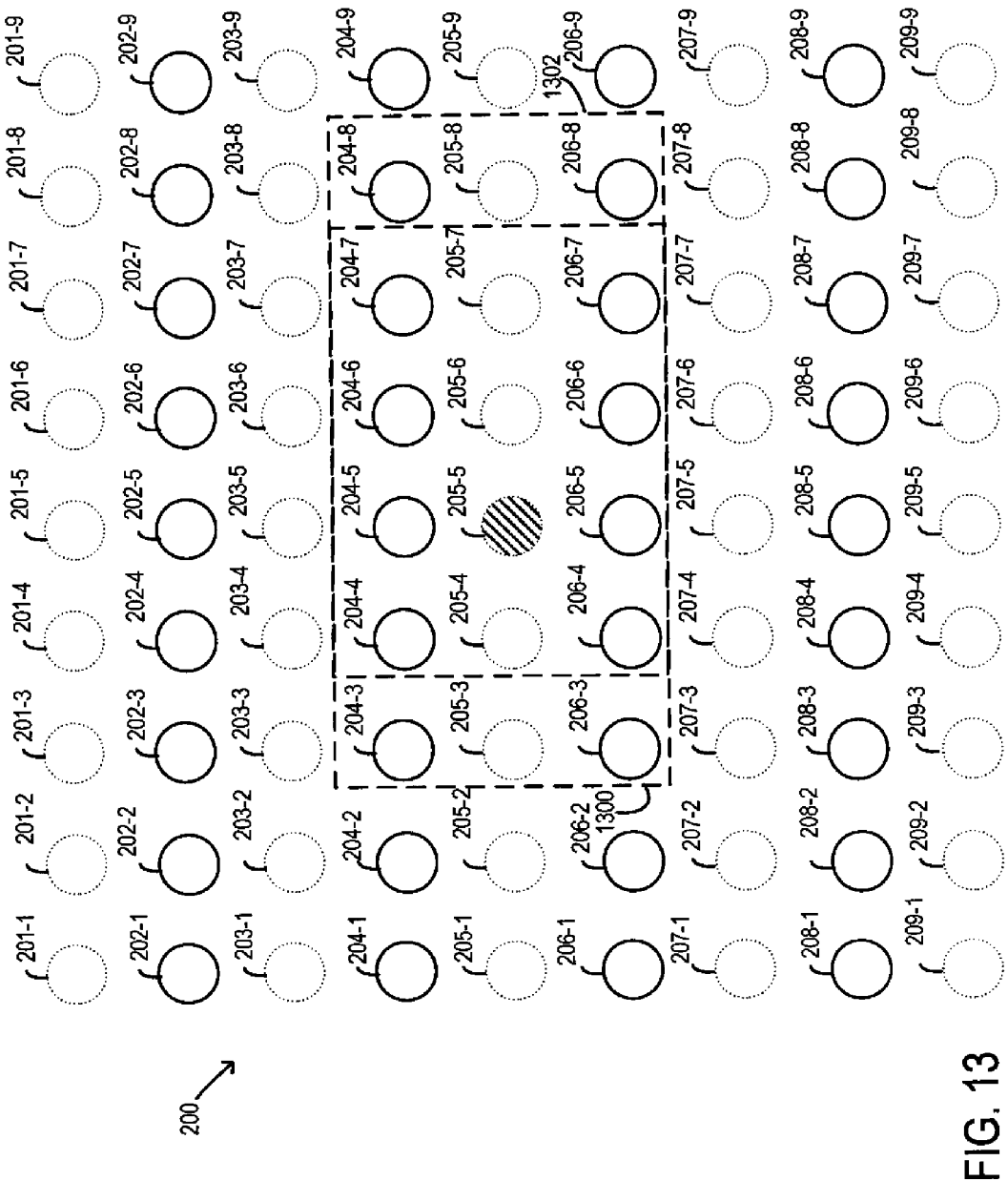
FIG. 13 schematically illustrates an aspect of a process in accordance with some embodiments.

FIG. 13 schematically illustrates a first rectangular group of pixels 1300 and a second group of pixels 1302 in a current field according to some embodiments. Referring to FIG. 13, in some embodiments, a first rectangular group of pixels 1300 and a second rectangular group of pixels 1302 may each include a subset of the pixels in the current field. In some embodiments, the first rectangular group of pixels 1200 may include a first row of pixels 204-3 to 204-7 and a second row of pixels 206-3 to 206-7. The second rectangular group of pixels 1202 may include a first row of pixels 204-4 to 204-8 and a second row of pixels 206-4 to 206-8. In such embodiments, the first rectangular group of pixels 1300 and the second rectangular group of pixels 1302 may each have dimensions of five pixels across by two pixels down.

In some embodiments, the first rectangular group of pixels 1300 and the second rectangular group of pixels 1302 may each include only original, non-interpolated pixels in the previous field. That is, in some embodiments, the first rectangular group of pixels 1300 and the second rectangular group of pixels 1302 do not include any pixels from the first line of pixels 201-1 to 201-9, the third line of pixels 203-1 to 203-9, the fifth line of pixels 205-1 to 205-9, the seventh line of pixels 207-1 to 207-9 or the ninth line of pixels 209-1 to 209-9, which are each shown in dotted lines for reference.

The first rectangular group of pixels 1300 may be centered around the location of the pixel to be interpolated. The second rectangular group of pixels 1302 may be centered around a location that is offset from the location of the pixel to be interpolated. The offset may be in accordance with a horizontal offset vector 1304. In some embodiments, the horizontal offset vector may be a vector 1, 0, which may represent a horizontal component equal to one pixel right.

If the first rectangular group of pixels 1300 and the second rectangular group of pixels 1302 each have a width of five pixels and a height of two pixels, the local self similarity for a pixel to be interpolated may be determined as the sum of ten absolute differences. Each absolute difference may be determined as an absolute difference between a value of a pixel in the first rectangular group of pixels and a value of a corresponding pixel in the second rectangular group of pixels. The ten absolute differences may include: (a) an absolute difference between the value of pixel 204-3 in the current field and the value of pixel 204-4 in the current field, (b) an absolute difference between the value of pixel 204-4 in the current field and the value of pixel 204-5 in the current field, (c) an absolute difference between the value of pixel 204-5 in the current field and the value of pixel 204-6 in the current field, (d) an absolute difference between the value of pixel 204-6 in the current field and the value of pixel 204-7 in the current field, (e) an absolute difference between the value of pixel 204-7 in the current field and the value of pixel 204-8 in the current field, (f) an absolute difference between the value of pixel 206-3 in the current field and the value of pixel 206-4 in the current field, and so on.

As stated above, in some embodiments, a plurality of horizontal offset vectors may be defined and a different local self similarly may be determined for each such horizontal offset vector.

In some embodiments, four horizontal offset vectors may be defined as follows:

$$1, 0 \quad 2, 0$$
$$-1, 0 \quad -2, 0$$

In such embodiments, four different local self similarities may be computed for each pixel to be interpolated. Each local self similarity may be determined with the second rectangular group of pixels centered around a location that is offset (from the location of the pixel to be interpolated) in accordance with a corresponding horizontal offset vector.

Figure 14:
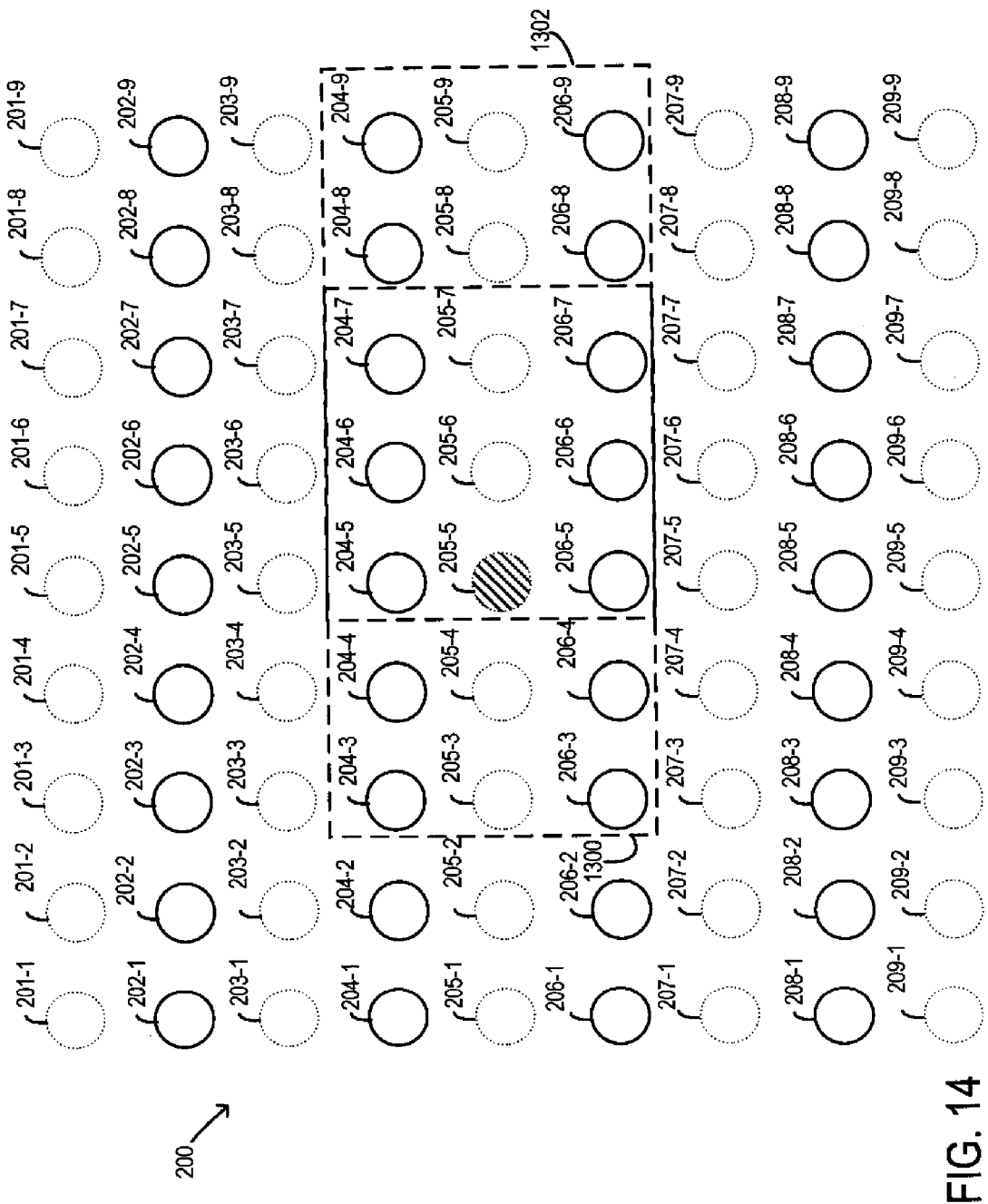
FIG. 14 schematically illustrates an aspect of a process in accordance with some embodiments.
Figure 15:
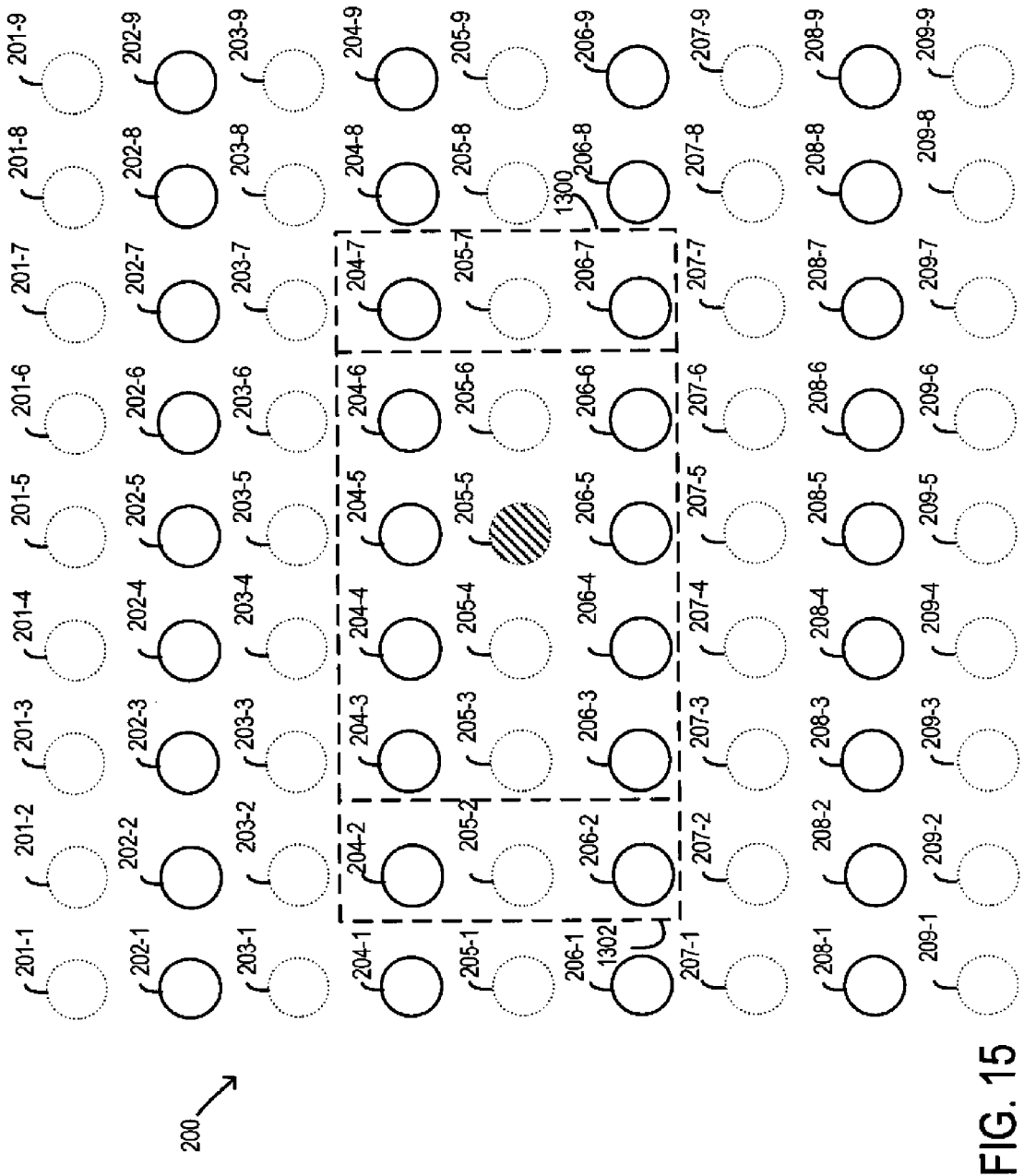
FIG. 15 schematically illustrates an aspect of a process in accordance with some embodiments.
Figure 16:
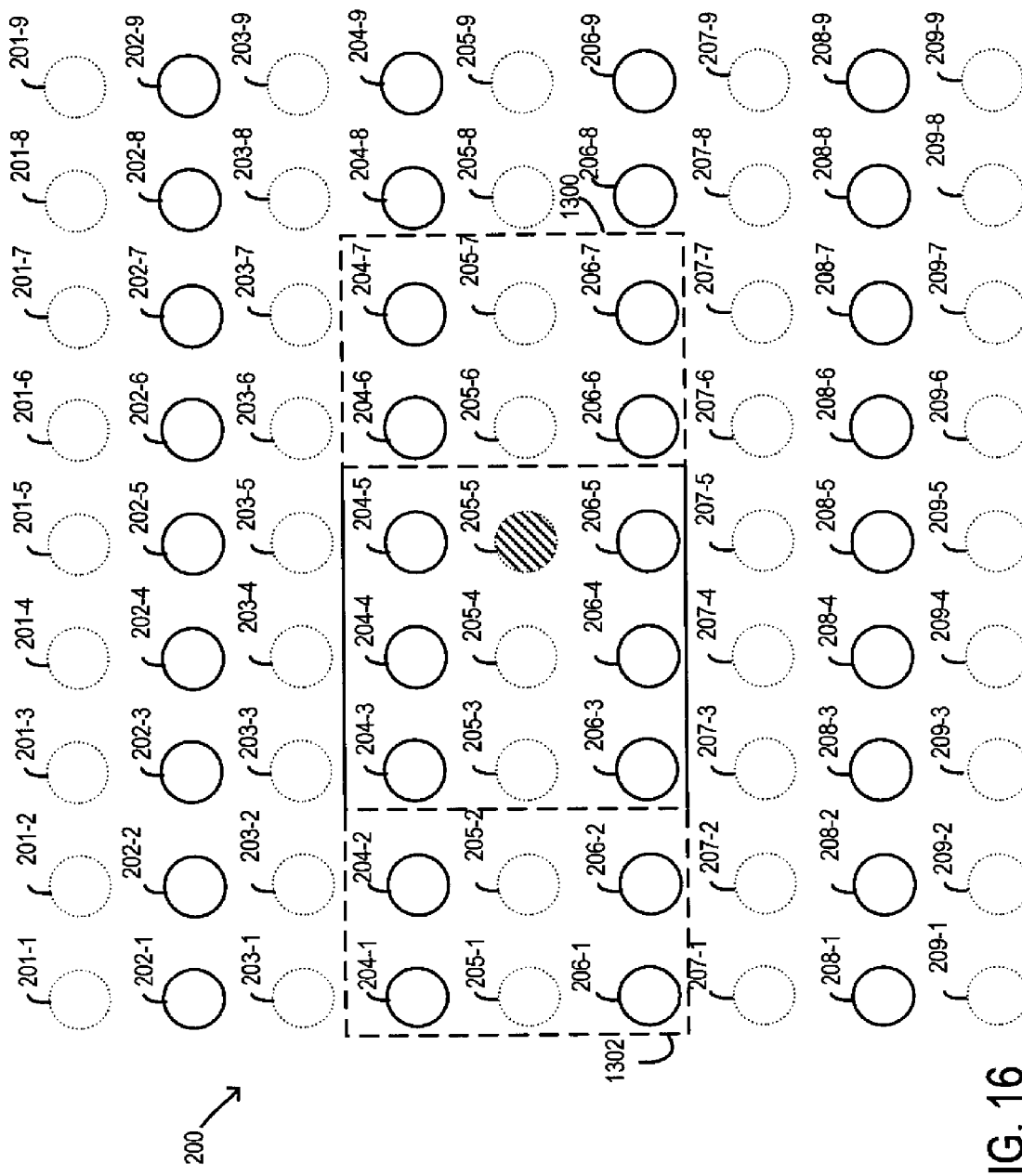
FIG. 16 schematically illustrates an aspect of a process in accordance with some embodiments.

In that regard, FIG. 13 schematically illustrates a second rectangular group of pixels 1302 that may be offset (from the location of the pixel to be interpolated) in accordance with horizontal offset vector 1, 0. FIG. 14 schematically illustrates a second rectangular group of pixels 1302 that may be offset in accordance with a horizontal offset vector 2, 0. FIG. 15 schematically illustrates a second rectangular group of pixels 1302 that may be offset in accordance with a horizontal offset vector −1, 0. FIG. 16 schematically illustrates a second rectangular group of pixels 1302 that may be offset in accordance with a horizontal offset vector −2, 0.

In such embodiments, the four local self similarities computed for a pixel to be interpolated may include (a) a local self similarity computed with the second rectangular group of pixels centered around a location offset (from the location of the pixel to be interpolated) in accordance with the horizontal offset vector 1, 0, (b) a local self similarity computed with the second rectangular group of pixels centered around a location offset in accordance with the horizontal offset vector 2, 0, (c) a local self similarity computed with the second rectangular group of pixels centered around a location offset in accordance with the horizontal offset vector −1, 0, and (d) a local self similarity computed with the second rectangular group of pixels 1302 centered around a location offset in accordance with the horizontal offset vector −2, 0.

In such embodiment, the local self similarity in the current field for the pixel to be interpolated may be determined as follows:

$$\sum_{1 \leq i \leq 5, 1 \leq j \leq 3} |P_1(i, j) \text{ current field} - P_1(i-k, j) \text{ current field}|$$

where $P_1(i,j)$ current field is the pixel value for the i'th pixel in the j'th row of the first rectangular group of pixels in the current field, $P_1(i-k,j)$ current field is the pixel value for the i'th pixel in the j'th row of the second rectangular group of pixels in the current field, and k is the row component of the offset from the location of the pixel to be interpolated.

Instead of a rectangular group of pixels having a width of five pixels and a height of three pixels, as in the example above, in some embodiments a rectangular group of pixels has a width of one, three, five, seven, eleven or more pixels, and a height of one, three, five, seven, eleven or more pixels, and/or any combination thereof. In some embodiments, a rectangular group of pixels may be only a single pixel.

In some embodiments, the local self similarity measurement block 426 may further determine a best local self similarity for the pixel to be interpolated. In some embodiments, the best local self similarity for the pixel to be interpolated may be based at least in part on the one or more local self similarities generated for the pixel being interpolated. In some embodiments, the best local self similarity for the pixel to be interpolated may be determined to be the one of such local self similarities having the smallest magnitude.

Referring again to FIG. 4, an output of the local self similarity measurement block 426 may supply the local self similarity for the pixel to be interpolated in the current field, which may be supplied to the motion detection SAD threshold generator block 430 and the motion estimation threshold generator block 432, further described hereinafter.

Figure 17:
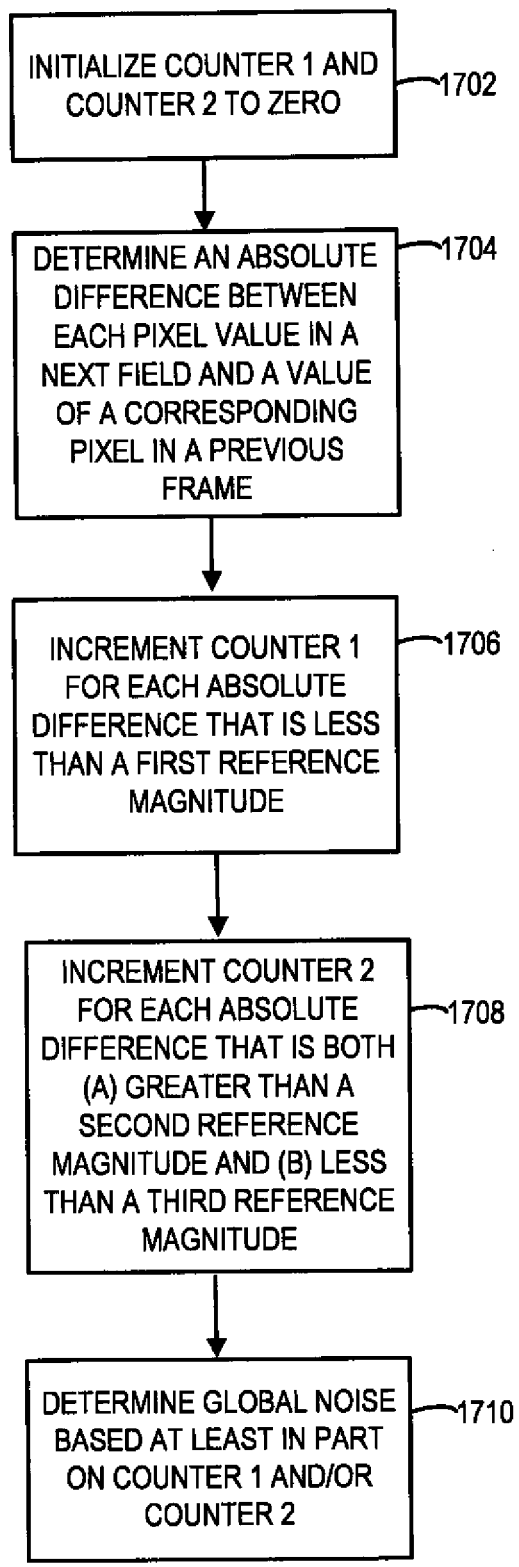
FIG. 17 is a flow chart that illustrates an aspect of a process according to some embodiments.

The global noise measurement block 428 may generate a global noise measurement. FIG. 17 is a flow chart that illustrates a process for determining a global noise measurement according to some embodiments. According to some embodiments, one or more portions of the process illustrated in FIG. 17 may be employed in the global noise measurement block 428.

Referring to FIG. 17, at 1702, in some embodiments, the process may include initializing a first counter and a second counter. At 1704, the process may further include determining an absolute difference between (a) each pixel value in a next field and (b) a value of a corresponding pixel in a previous field. In some embodiments, the number of absolute differences may be equal to the number original non-interpolated pixels in the next field and/or the previous field. That is, in some embodiments, absolute differences may not be generated for pixels that are not included in next field and the previous field and are thus interpolated pixels, i.e., supplied by interpolation, in order to de-interlace the next field and/or the previous field.

At 1706, the magnitude of the first counter may be incremented for each absolute difference that is less than a first reference magnitude. In some embodiments, the first reference magnitude may be equal to 40.

At 1708, the magnitude of the second counter may be incremented for each absolute difference that is (a) greater than or equal to a second reference magnitude and (b) less than a third reference magnitude. In some embodiments, the second reference magnitude may be equal to 30 and the third reference magnitude may be equal to 37.

At 1710, the process may further include determining a global noise measurement based at least in part on the magnitude of the first counter and/or the magnitude of the second counter. In that regard, some embodiments may generate a global noise measurement having a magnitude equal to the magnitude of the second counter.

Referring again to FIG. 4, an output of the global noise measurement block 428 may supply the global noise measurement for the current field, which may be supplied to the motion detection SAD threshold generator block 430, the motion estimation threshold generator block 432 and a motion detection MAD threshold generator block 434.

The motion detection SAD threshold generator block 430 may generate an SAD threshold, which may be supplied to the SAD thresholding block 408. The motion detection MAD threshold generator block 434 may generate an MAD threshold, which may be supplied to the MAD thresholding block 412. The motion estimation threshold generator block 432 may generate a local best SAD threshold, which may be supplied to the best SAD thresholding block 420.

Figure 18:
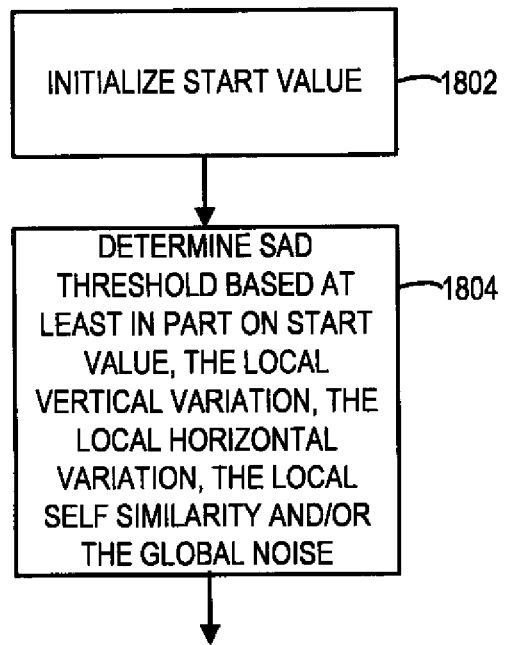
FIG. 18 is a flow chart that illustrates an aspect of a process according to some embodiments.

FIG. 18 is a flow chart that illustrates a process for determining an SAD threshold for a pixel to be interpolated, in accordance with some embodiments. Referring to FIG. 18, in some embodiments, at 1802, a start value may be initialized.

At 1804, the process may determine an SAD threshold based at least in part on the start value, the local vertical variation, the local horizontal variation, the local self similarity and/or the global noise. The relationship between the SAD threshold, the start value, the local vertical variation, the local horizontal variation, the local self similarity and/or the global noise may be linear, non-linear or a combination thereof. In some embodiments, the SAD threshold may be determined as a weighted sum as follows:

SAD threshold=start value+$a_1$local vertical variation+$a_2$local horizontal variation+$a_3$local self similarity+$a_4$global noise where $a_1$ is a first weighting factor, $a_2$ is a second weighting factor, $a_3$ is a third weighting factor, $a_4$ is a fourth weighting factor, In some embodiments, if the magnitude of the SAD threshold is greater than the magnitude of the local self similarity, the SAD threshold may be determined as follows:

SAD threshold=$a_5$similarity measurement, where $a_5$ is a fifth weighting factor In some such embodiments, the fifth weighting factor a5 may have a value in a range between 0.5 and 1.0.

In some embodiments a different SAD threshold is generated for each pixel to be interpolated. In some such embodiments, the SAD threshold generated for one pixel may or may not be the same as the SAD threshold generated for another pixel to be interpolated.

Figure 19:
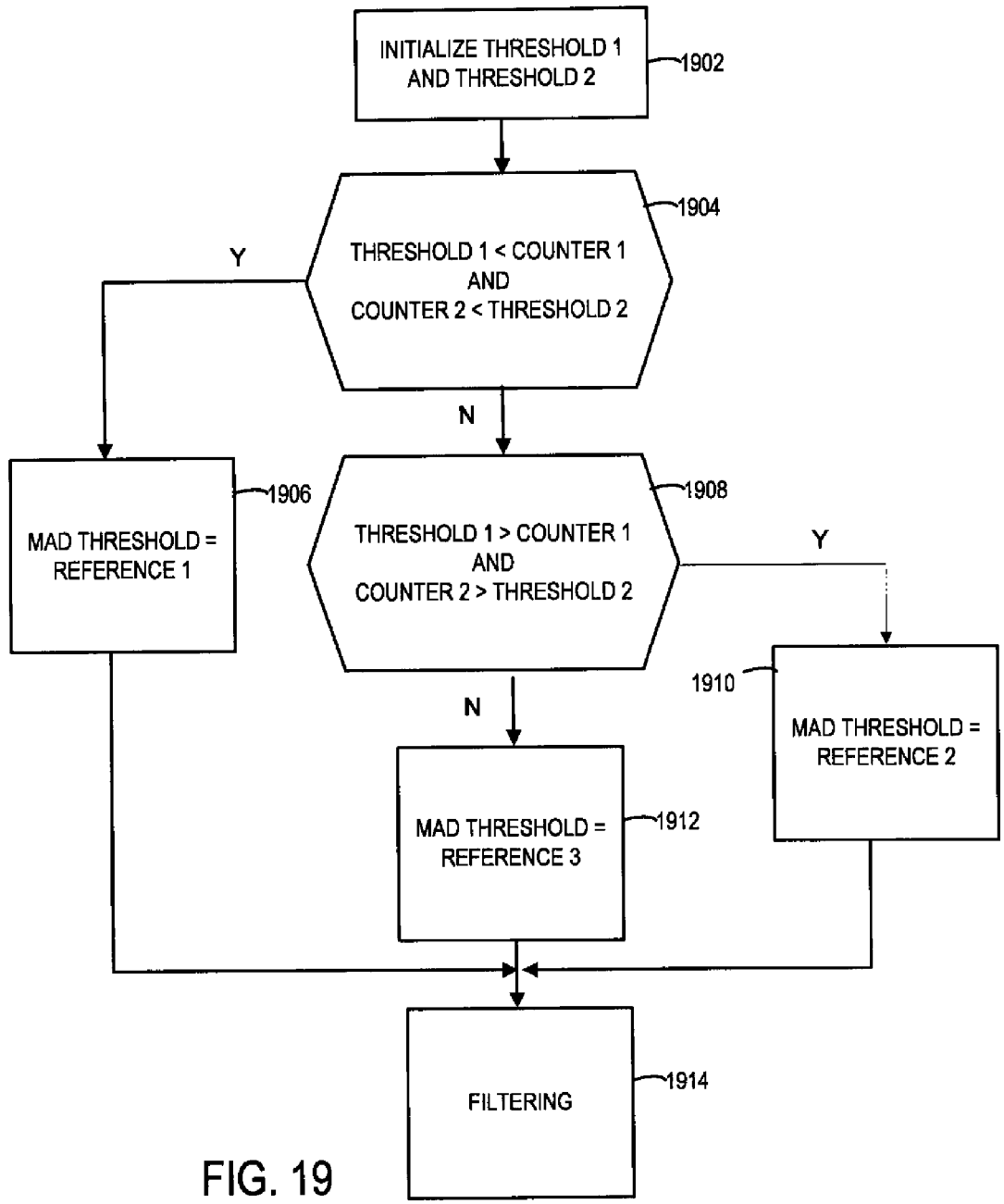
FIG. 19 is a flow chart that illustrates an aspect of a process according to some embodiments.

FIG. 19 is a flow chart that illustrates a process for determining a MAD threshold for a pixel to be interpolated, in accordance with some embodiments. Referring to FIG. 19, in some embodiments, at 1902, a first threshold and a second threshold may be initialized. At 1904, a determination may be made as to whether (a) the first threshold is less than the first counter (FIG. 17) and (b) the second threshold is greater than the second counter (FIG. 17). If so, at 1906, the process may generate a MAD threshold having a magnitude equal to a first reference value. In some embodiments, the first reference value has a magnitude that is large relative to a magnitude of a second reference value described below, e.g., 28.

Otherwise, at 1908, the process may determine whether (a) the first threshold is greater than the first counter and (b) the second threshold is less than the second counter. If so, at 1910, the process may generate a MAD threshold having a magnitude equal to a second reference value. As stated above, in some embodiments, the second reference value has a magnitude that is small compared to the magnitude of the first reference value, e.g., 4.

Otherwise, at 1912, the process may generate a MAD threshold having a magnitude equal to a third reference value. In some embodiments, the third reference value is a value between the first reference value and the second reference value, e.g., 16.

At 1914, filtering may be provided to reduce the effect of any fluctuation in the MAD threshold value. In some embodiments, the filtering may include temporal filtering. In some embodiments, the filtering may include filtering that is the same as or similar to filtering that may be provided for the SAD and/or the MAD.

In some embodiments a different MAD threshold is generated for each pixel to be interpolated. In some such embodiments, the MAD threshold generated for one pixel may or may not be the same as the MAD threshold generated for another pixel to be interpolated.

Figure 20:
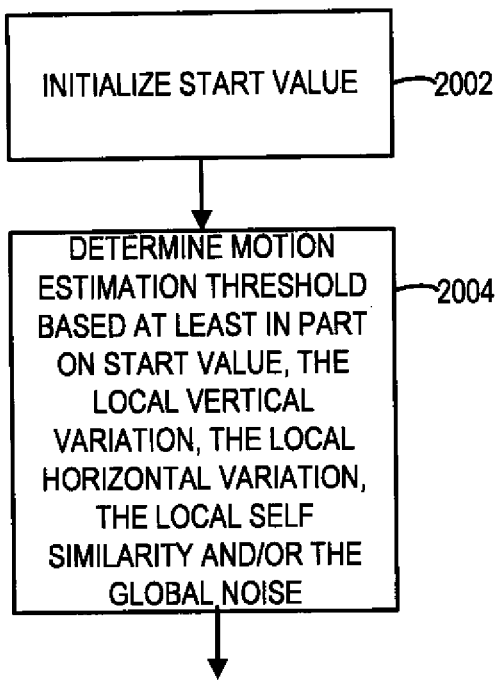
FIG. 20 is a flow chart that illustrates an aspect of a process according to some embodiments.

FIG. 20 is a flow chart that illustrates a process for determining local best SAD threshold, in accordance with some embodiments. Referring to FIG. 20, in some embodiments, at 2002, a start value may be initialized. At 2004, the process may determine a motion estimation threshold based at least in part on the start value, the local vertical variation, the local horizontal variation, the local self similarity and/or the global noise. The relationship between the motion estimation threshold, the start value, the local vertical variation, the local horizontal variation, the local self similarity and/or the global noise may be linear, non-linear or a combination thereof. In some embodiments, the motion estimation threshold may be determined as a weighted sum as follows:

motion estimation threshold=start value+$b_1$local vertical variation+$b_2$local horizontal variation+$b_3$local self similarity+$b_4$global noise where $b_1$ is a first weighting factor, $b_2$ is a second weighting factor, $b_3$ is a third weighting factor, $b_4$ is a fourth weighting factor, In some embodiments, if the magnitude of the motion estimation threshold is greater than the magnitude of the local self similarity, the threshold may be determined as follows:

threshold=$b_5$similarity measurement, where $b_5$ is a fifth weighting factor

In some such embodiments, the fifth weighting factor b5 may have a value in a range between 0.5 and 1.0.

In some embodiments a different motion estimation threshold is generated for each pixel to be interpolated. In some embodiments, the motion estimation threshold generated for one pixel may or may not be the same as the motion estimation threshold generated for another pixel to be interpolated.

Referring again to FIG. 4, in some embodiments, it may be desirable to determine whether the video content is normal interlaced video content or whether the video content is 2:2 pull down content. In some embodiments, this may be performed by detecting local tearing. In that regard, in some embodiments, normal interlaced video content may have a relatively constant degree of local tearing between frames. If the content is 2:2 pull down, there may be relatively little or no local tearing between some frames and significantly greater tearing between some other frames.

In that regard, the apparatus 400 may further include a local tearing detector 436.

Figure 21:
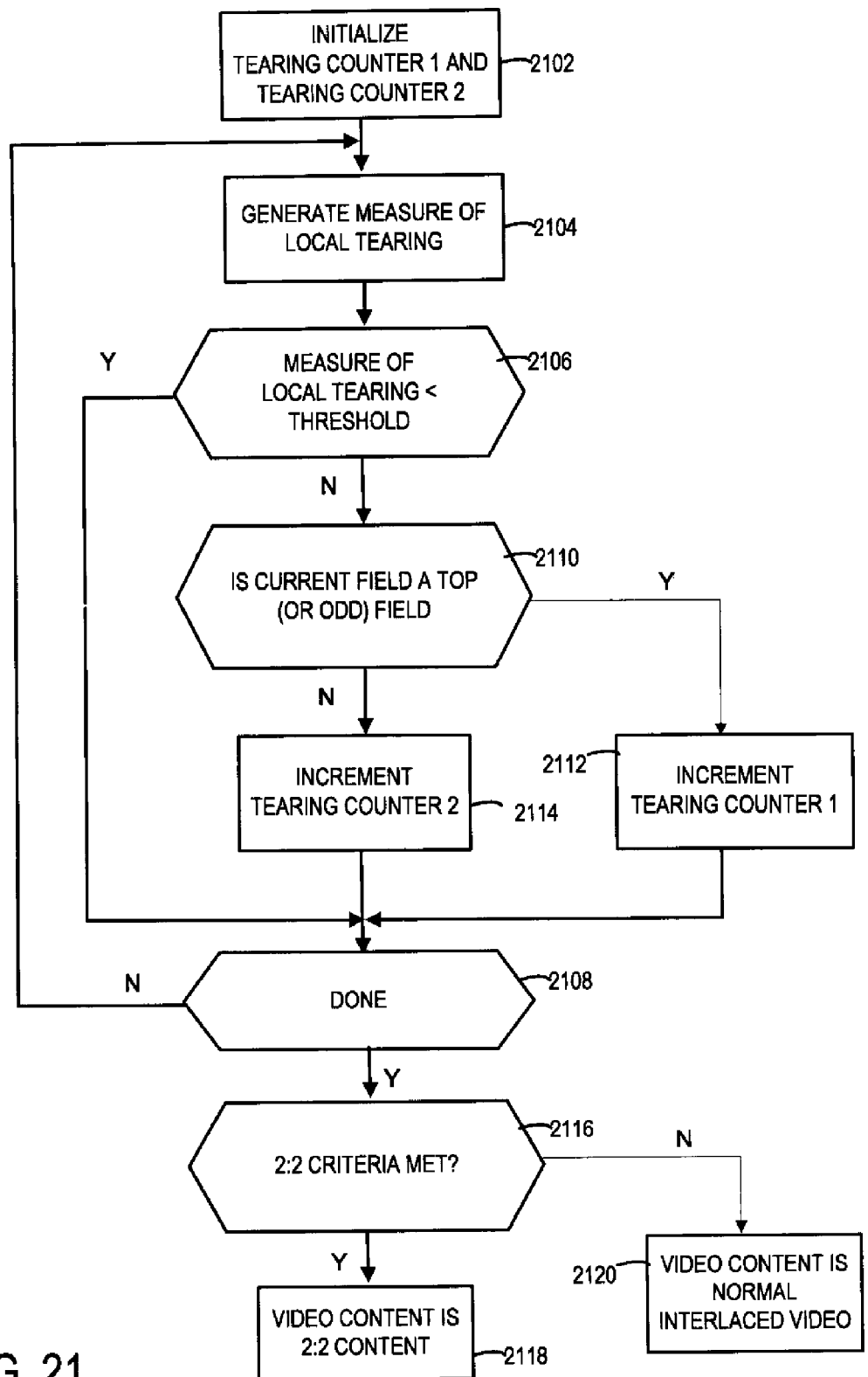
FIG. 21 is a flow chart that illustrates an aspect of a process according to some embodiments.

FIG. 21 is a flow chart that illustrates a process for detecting local tearing, in accordance with some embodiments. Referring to FIG. 21, in some embodiments, at 2102, a first tearing counter and a second tearing counter may be initialized. At 2104, a measure of local tearing is determined. In some embodiments, the measure determines whether a pixel is brighter or darker than both of its vertical neighbors. In some embodiments, the measure of local tearing is determined as follows:

|$P_1(i,j+1)$ current field−$P_1(i,j)$ current field|+|$P_1(i,j)$ current field−$P_1(i,j-1)$ current field|−|$P_1(i,j+1)$ current field−$P_1(i,j-1)$ current field| where $P_1(i,j)$ current field is the pixel value for the i'th pixel in the j'th row of the current field, $P_1(i,j+1)$ current field is the pixel value above the i'th pixel in the j'th row of the current field, and $P_1(i,j-1)$ current field is the pixel value below the i'th pixel in the j'th row of the current field, In some embodiments, the measure of local tearing is determined for each pixel in the current field.

At 2106, a determination may be made as to whether the measure of local tearing is less than a threshold. In some embodiments, the measure of tearing may have a magnitude less than the threshold if the value of the pixel is between the values of its vertical neighbors. The measure of tearing may have a magnitude greater than the threshold if the value of the pixel is not between the values of the vertical neighbors. In some embodiments, the threshold may have a magnitude equal to 10.

If the measure of local tearing has a magnitude less than the threshold, then at 2108, a determination may be made as to whether a measure of local tearing has been determined for all desired pixels. If not, execution returns to 2104 and a measure of local tearing is determined for another pixel in the field.

If at 2108, the measure of local tearing has a magnitude greater than the threshold, then at 2110, the process may determine whether the current field is a top (or odd) field. If the current field is a top field, then at 2112, the first tearing counter may be increased (e.g., incremented). If the current field is a bottom (or even) field, then at 2114, the second tearing counter may be increased (e.g., incremented).

As stated above, at 2108, a determination may be made as to whether a measure of local tearing has been determined for all desired pixels. If so, at 2116, the process may determine whether the video content is 2:2 pull down video content or normal interlaced video content. In some embodiments, the determination may be based at least in part on one or both of the tearing counters and/or one or more criteria. In some embodiments, the process may determine that the video content is 2:2 pull down video content if either of the tearing counters is greater than the sum of twice the other tearing counter and 100. Otherwise, at 2120, the process may determine that the video content is normal interlaced video. In some embodiments, the first tearing counter and the second tearing counter are maintained and updated in response to the next top and bottom field.

Referring again to FIG. 4, in some embodiments, the first tearing counter and/or the second tearing counter may be supplied to a global 2:2 detector 438, which may determine whether the video content is 2:2 pull down video content or normal interlaced video content, for example as described above with respect to FIG. 21.

An output of the global 2:2 detector 438 may supply a signal indicative of whether the video content is 2:2 pull down video content or normal interlaced video content. The indication may be supplied to an input of the decision block 409.

In some embodiments, the decision block 409 may characterize the location of the pixel to be interpolated as having "no motion" if the local zero motion SAD or local zero motion MAD is lower than the corresponding threshold. Otherwise, the decision block 409 may characterize the location of the pixel to be interpolated as having "slow motion" if the motion SAD is lower than its corresponding threshold and the best motion vector is the same as the previous motion vector. If the location is not characterized as "no motion" or "slow motion" as set forth above, the decision block 409 may characterize the location as "fast moving".

In some embodiments, the decision block 409 may select a type of interpolation for use in determining a value of a pixel to be interpolated. In some embodiments, the decision block 409 may select inter-field de-interlacing if the location of the pixel to be interpolated is characterized as "no motion". The decision block 409 may select motion compensated de-interlacing if the location of the pixel to be interpolated is characterized as having "slow motion". The decision block 409 may select intra-field de-interlacing if the location of the pixel to be interpolated is characterized as "fast moving".

In some embodiments, slow motion is "disabled" if 2:2 video content is detected. Thus, for 2:2 video content, the decision block 409 may select intra-field de-interlacing unless the location of the pixel to be interpolated is characterized as having "no motion"

Figure 22:
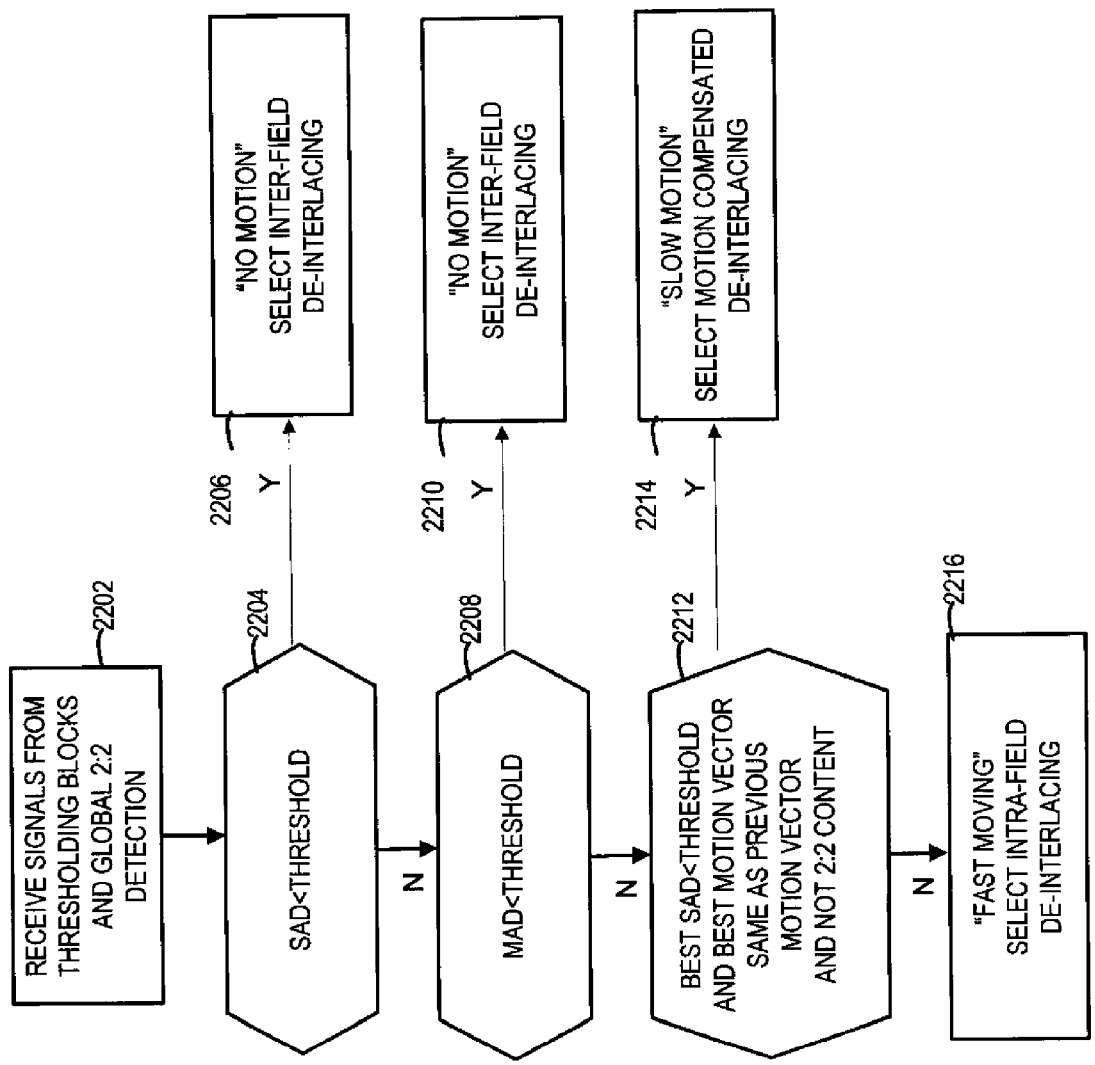
FIG. 22 is a flow chart that illustrates an aspect of a process according to some embodiments.

FIG. 22 is a flow chart that illustrates a process for selecting a type of de-interlacing in accordance with some embodiments. Referring to FIG. 22, in some embodiments, at 2202, signals may be received from thresholding and global 2:2.

At 2204, a determination may be made as to whether the SAD is less than the corresponding threshold, and if so, at 2206, the location of the pixel to be interpolated may be characterized as having "no motion" and inter-field de-interlacing may be selected.

If the SAD is not less than the threshold, at 2208, a determination may be made as to whether the MAD is less than the corresponding threshold, and if so, at 2210, the location of the pixel to be interpolated may be characterized as having "no motion" and inter-field de-interlacing may be selected.

If the MAD is not less than the threshold, at 2212, a determination may be made as to whether (a) the best SAD is less than the corresponding threshold, (b) the best motion vector is the same as the previous motion vector and (c) the video content is not 2:2 video content, and if so, at 2214, the location of the pixel to be interpolated may be characterized as having "slow motion" and motion compensated de-interlacing may be selected.

Otherwise, at 2216, the location of the pixel to be interpolated is characterized as "fast moving" and intra-field de-interlacing may be selected.

If characterization satisfies a first criteria. In some embodiments, the decision block may select the one or more types of interpolation based at least in part on the signal from the global 2:2 detection block, the signal from the thresholding block 406, the signal from the thresholding block 412 and/or the signal from the thresholding block 420.

In some embodiments, the decision block 409 selects inter-field de-interlacing if the characterization satisfies a first criteria. In some embodiments, the decision block selects inter-field de-interlacing if the filtered SAD for the pixel to be interpolated is less than the threshold used by thresholding block 406 and/or if the location of the pixel to be added is characterized as having no motion. In some embodiments, the location of the pixel to be added is characterized as having no motion if the filtered SAD for the pixel to be interpolated is less than the threshold used by thresholding block 406.

In some embodiments, the decision block 409 selects motion compensated de-interlacing if the characterization satisfies a second criteria. In some embodiments, the decision block selects motion compensated de-interlacing if (a) the filtered MAD for the pixel to be interpolated is less than the threshold used by thresholding block 412 and/or if the location of the pixel to be added is characterized as having no motion. In some embodiments, the location of the pixel to be added is characterized as having no motion if the filtered SAD for the pixel to be interpolated is less than the threshold used by thresholding block 406.

As stated above, in some embodiments, the selection of a type of de-interlacing is based at least in part on a characterization of one or more portions of one or more video signals. As used herein, a characterization may be any type of characterization. In some embodiments, a characterization may indicate whether one or more portions of one or more video signals satisfy one or more criteria. Criteria may be any type or types of criteria. In some embodiments, a characterization may indicate whether one or more portions of one or more video signals, or one or more signals generated in response at least thereto, are less than, greater than and/or equal to one or more thresholds. In some embodiments, a criteria may comprise whether one or more portions of one or more video signals, or one or more signals generated in response at least thereto, are less than, greater than and/or equal to one or more thresholds.

In some embodiments, a process in accordance with one or more embodiments set forth herein may be performed for some or all of the locations of pixels that are to be interpolated to supply missing lines of a video signal field and thus to de-interlace the video signal field. In that regard, in some embodiments, each stage of the process set forth herein may be performed at a single pixel location for a pixel to be interpolated and/or may be repeated at a pixel location for each pixel to be interpolated. In some embodiments, such pixels may include each pixel to be interpolated at top, bottom and/or side edges. Alternatively, at top, bottom and/or side edges, one or more pixel values may be generated by one or more other processes such as filling with black pixels, filling with duplicates of edge pixel values, mirroring pixel values from the edge. In another alternative, at one or more edges, only intra-field de-interlacing or inter-field de-interlacing are used.

Figure 23:
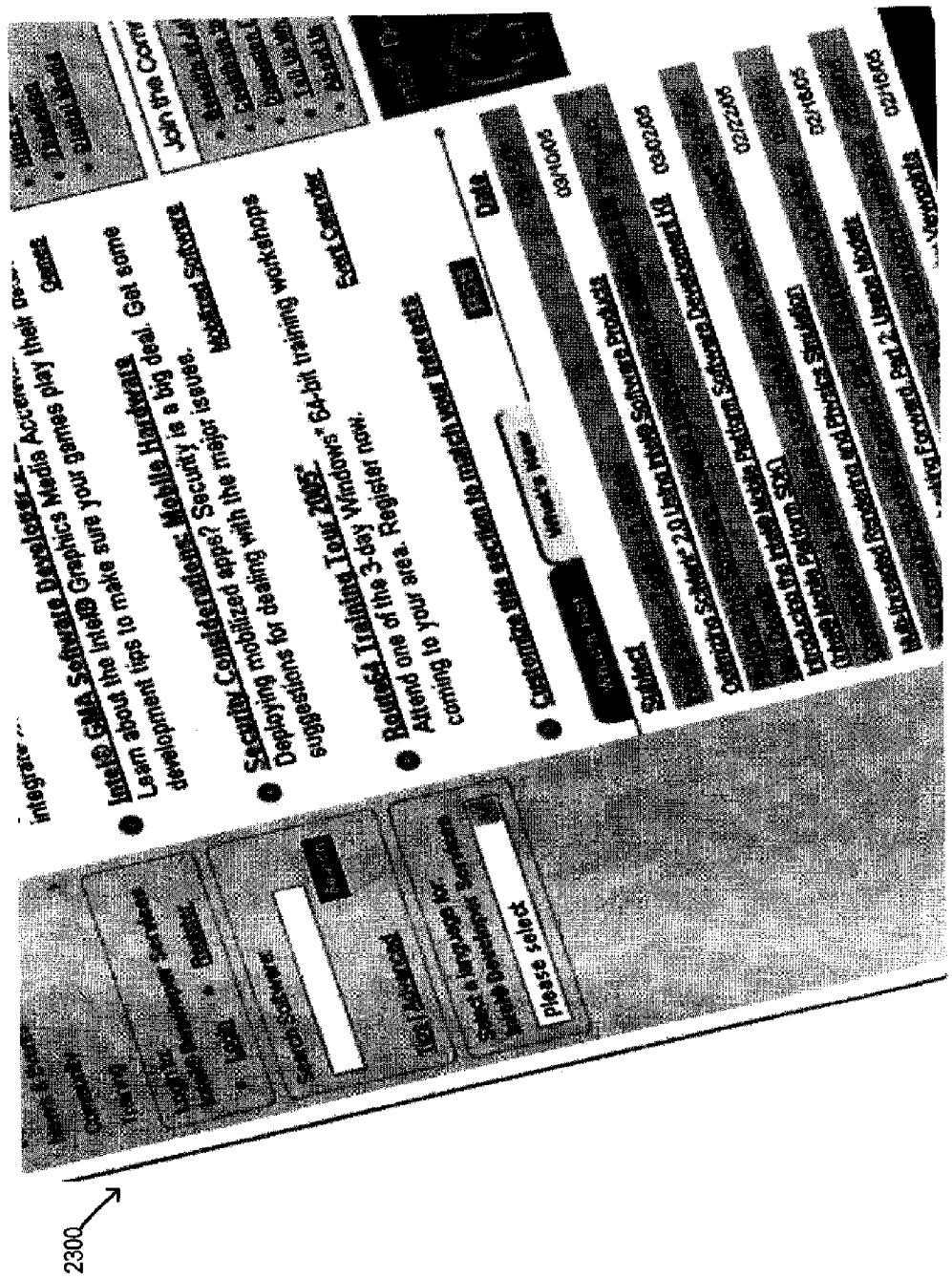
FIG. 23 shows one de-interlaced image generated in accordance with one embodiment.

FIG. 23 shows one de-interlaced image 2300 generated in accordance with one embodiment of a de-interlacer that may select inter-field de-interlacing if the location of the pixel to be interpolated is characterized as "no motion", motion compensated de-interlacing if the location of the pixel to be interpolated is characterized as having "slow motion", and intra-field de-interlacing if the location of the pixel to be interpolated is characterized as "fast moving". Other embodiments may or may not provide similar results.

Figure 24:
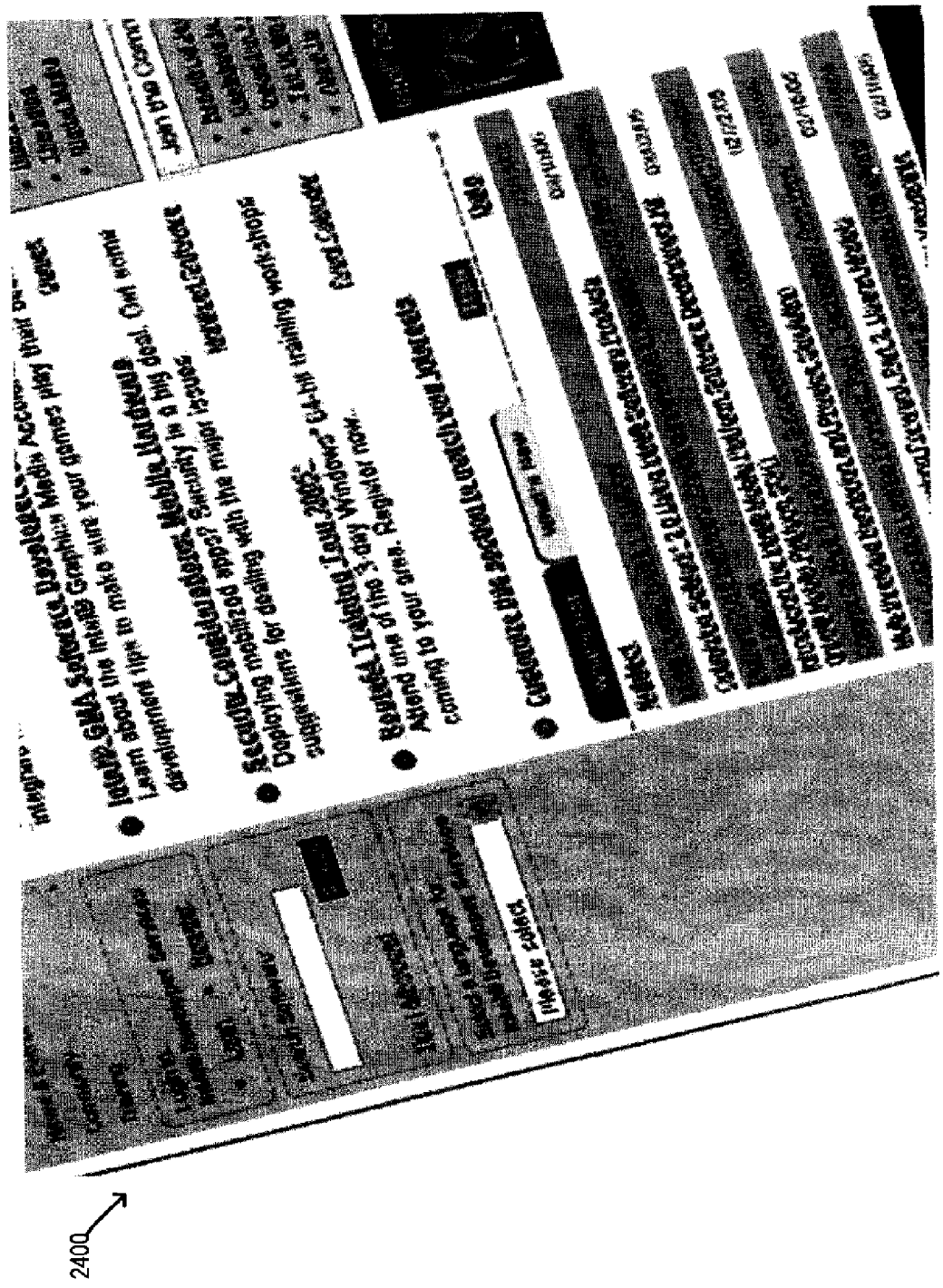
FIG. 24 shows one de-interlaced image generated in accordance with a conventional de-interlacer.

FIG. 24 shows one de-interlaced image 2400 generated in accordance with a conventional de-interlacer.

Figure 8:
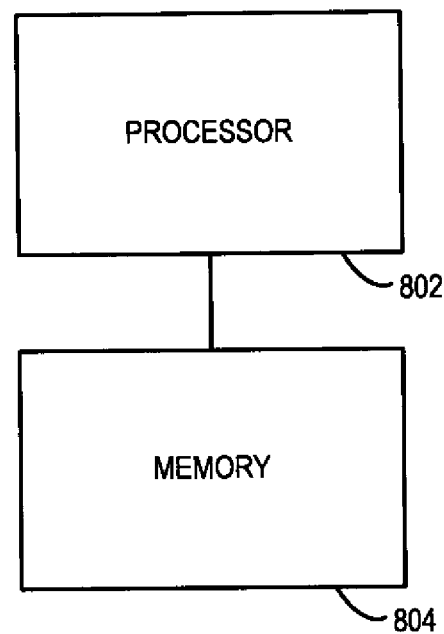
FIG. 8 is a block diagram of an embodiment of the de-interlacing component of the apparatus of FIG. 1.

In some embodiments, the de-interlacing process block may be implemented in the form of application-specific integrated circuitry, configured to perform one, some or all portions of the de-interlacing processes described herein. In some embodiments, the de-interlacing process block may be constituted at least in part by a processor 802 (FIG. 8) coupled to a memory 804. The processor 802 may be, for example, a general purpose microprocessor or digital signal processor or other programmable processor. The memory 804 may store software instructions to control the processor 802 to perform one of the de-interlacing processes described above, and may also serve as working memory and/or input and/or output digital video signal storage memory. In some embodiments, the processor may be, for example, programmable or non programmable, general purpose or special purpose, dedicated or non dedicated, distributed or non distributed, shared or not shared, and/or any combination thereof. If the processor has two or more distributed portions, the two or more portions may communicate with one another through a communication link. A processor may include, for example, but is not limited to, hardware, software, firmware, hardwired circuits and/or any combination thereof.

Unless otherwise stated, terms such as, for example, "based on" mean "based at least on", so as not to preclude being based on, more than one thing. In addition, unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

The several embodiments described herein are solely for the purpose of illustration. Persons skilled in the art will recognize from this description other embodiments may be practiced with modifications and alterations limited only by the claims.

What is claimed is:

1. A method comprising:
receiving a plurality of video signal fields;
characterizing at least one portion of at least one of the plurality of video signal fields;
determining a value for a pixel using inter-field de-interlacing if the characterization satisfies a first criteria;
determining a value for a pixel using motion compensated de-interlacing if the characterization satisfies a second criteria; and
determining a value for a pixel using intra-field de-interlacing if the characterization satisfies a third criteria;
wherein characterizing at least one portion of at least one of the plurality of video signal fields comprises:
determining a first sum of absolute differences based at least in part on the plurality of video signal fields; and
filtering the first sum of absolute differences to provide a filtered sum of absolute differences;
determining a second sum of absolute differences based at least in part on the plurality of video signal fields;
generating a threshold value based at least in part on the second sum of absolute differences;
comparing the filtered sum of absolute differences to the threshold; and
wherein determining a value for a pixel using inter-field de-interlacing if the characterization satisfies a first criteria comprises:
determining the value for the pixel using inter-field de-interlacing if the filtered sum of absolute differences is less than the threshold.

2. The method of claim 1 wherein characterizing at least one portion of at least one of the plurality of video signal fields further comprises:
generating a signal indicative of whether the filtered sum of absolute differences is less than the threshold.

3. The method of claim 1 wherein characterizing at least one portion of at least one of the plurality of video signal fields comprises:
determining whether the plurality of video signal fields include 2:2 pull down video content.

4. The method of claim 3 wherein determining a value for a pixel using intra-field de-interlacing if the characterization satisfies a third criteria comprises:
determining a value for a pixel using intra-field de-interlacing if the video signal fields include 2:2 pull down video content and the characterization does not satisfy the first criteria.

5. The method of claim 1 wherein determining the second sum of absolute differences based at least in part on the plurality of video signal fields comprises:
determining a local vertical variation for the pixel as a sum of absolute differences between a first group of pixels in one of the plurality of video signal fields and a second group of pixels in the one of the plurality of video signal fields;
the method further comprising:
determining a local horizontal variation for the pixel as a sum of absolute differences between a third group of pixels in the one of the plurality of video signal fields and a fourth group of pixels in the one of the plurality of video signal fields;
determining a local self similarity for the pixel as a sum of absolute differences between a fifth group of pixels in the one of the plurality of video signal fields and a sixth group of pixels in the one of the plurality of video signal fields; and
determining a global noise measurement;
wherein the first group of pixels is a rectangular group of pixels centered around a location of a pixel immediately above the pixel for which the value is determined using inter-field de-interlacing;
wherein the second group of pixels is a rectangular group of pixels centered around a location of a pixel immediately below the pixel for which the value is determined using inter-field de-interlacing;
wherein the third group of pixels is a rectangular group of pixels centered around a location of a pixel immediately left of the pixel for which the value is determined using inter-field de-interlacing;
wherein the fourth group of pixels is a rectangular group of pixels centered around a location of a pixel immediately right of the pixel for which the value is determined using inter-field de-interlacing;
wherein the fifth group of pixels is a rectangular group of pixels centered around a location of the pixel for which the value is determined using inter-field de-interlacing;
wherein the sixth group of pixels is a rectangular group of pixels centered around a location offset horizontally from the location of the pixel for which the value is determined using inter-field de-interlacing; and
wherein generating the threshold value based at least in part on the second sum of absolute differences comprises:
generating the threshold value based at least in part on the local vertical variation, the local horizontal variation, the local self similarity and the global noise measurement.

6. An apparatus comprising:
circuitry to receive a plurality of video signal fields, to characterize at least one portion of at least one of the plurality of video signal fields, to determine a value for a pixel using inter-field de-interlacing if the characterization satisfies a first criteria, to determine a value for a pixel using motion compensated de-interlacing if the characterization satisfies a second criteria, and to determine a value for a pixel using intra-field de-interlacing if the characterization satisfies a third criteria;
wherein circuitry to characterize at least one portion of at least one of the video signal fields comprises:
circuitry to determine a first sum of absolute differences based at least in part on the plurality of video signal fields and to filter the first sum of absolute differences to provide a filtered sum of absolute differences; and
circuitry to determine a second sum of absolute differences based at least in part on the plurality of video signal fields, to generate a threshold value based at least in part on the second sum of absolute differences, and to compare the filtered sum of absolute differences to the threshold; and
wherein circuitry to determine a value for a pixel using inter-field de-interlacing if the characterization satisfies a first criteria comprises:
circuitry to determine a value for a pixel using inter-field de-interlacing if the filtered sum of absolute differences is less than the threshold.

7. The apparatus of claim 6 wherein circuitry to characterize at least one portion of at least one of the plurality of video signal fields further comprises:
circuitry to generate a signal indicative of whether the filtered sum of absolute differences is less than the threshold.

8. The apparatus of claim 6 wherein circuitry to characterize at least one portion of at least one of the plurality of video signal fields comprises:
  circuitry to determine whether the plurality of video signal fields include 2:2 pull down video content.

9. The apparatus of claim 8 wherein circuitry to determine a value for a pixel using intra-field de-interlacing if the characterization satisfies a third criteria comprises:
  circuitry to determine a value for a pixel using intra-field de-interlacing if the video signal fields include 2:2 pull down video content and the characterization does not satisfy the first criteria.

10. The apparatus of claim 6 wherein circuitry to characterize at least one portion of at least one of the plurality of video signal fields comprises:
  circuitry to determine a local vertical variation for the pixel as a sum of absolute differences between a first group of pixels in one of the plurality of video signal fields and a second group of pixels in the one of the plurality of video signal fields;
  the apparatus further comprising:
  circuitry to determine a local horizontal variation for the pixel as a sum of absolute differences between a third group of pixels in the one of the plurality of video signal fields and a fourth group of pixels in the one of the plurality of video signal fields, to determine a local self similarity for the pixel as a sum of absolute differences between a fifth group of pixels in the one of the plurality of video signal fields and a sixth group of pixels in the one of the plurality of video signal fields, and to determine a global noise measurement;
  wherein the first group of pixels is a rectangular group of pixels centered around a location of a pixel immediately above the pixel for which the value is determined using inter-field de-interlacing;
  wherein the second group of pixels is a rectangular group of pixels centered around a location of a pixel immediately below the pixel for which the value is determined using inter-field de-interlacing;
  wherein the third group of pixels is a rectangular group of pixels centered around a location of a pixel immediately left of the pixel for which the value is determined using inter-field de-interlacing;
  wherein the fourth group of pixels is a rectangular group of pixels centered around a location of a pixel immediately right of the pixel for which the value is determined using inter-field de-interlacing;
  wherein the fifth group of pixels is a rectangular group of pixels centered around a location of the pixel for which the value is determined using inter-field de-interlacing;
  wherein the sixth group of pixels is a rectangular group of pixels centered around a location offset horizontally from the location of the pixel for which the value is determined using inter-field de-interlacing; and
  wherein circuitry to generate the threshold value based at least in part on the second sum of absolute differences comprises:
  circuitry to generate the threshold value based at least in part on the local vertical variation, the local horizontal variation, the local self similarity and the global noise measurement.

* * * * *